US012613484B2

(12) United States Patent
Yamaji

(10) Patent No.: US 12,613,484 B2
(45) Date of Patent: Apr. 28, 2026

(54) HEATING MEMBER, FIXING DEVICE, AND IMAGE FORMING APPARATUS

(71) Applicant: SHARP KABUSHIKI KAISHA, Sakai City (JP)

(72) Inventor: Hiroyuki Yamaji, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 0 days.

(21) Appl. No.: 18/804,366

(22) Filed: Aug. 14, 2024

(65) Prior Publication Data

US 2025/0085651 A1 Mar. 13, 2025

(30) Foreign Application Priority Data

Sep. 13, 2023 (JP) ................................ 2023-148513

(51) Int. Cl.
*G03G 15/20* (2006.01)

(52) U.S. Cl.
CPC ..... *G03G 15/2053* (2013.01); *G03G 15/2039* (2013.01); *G03G 15/2064* (2013.01); *G03G 2215/2038* (2013.01); *G03G 2215/2051* (2013.01)

(58) Field of Classification Search
CPC ........... G03G 15/2017; G03G 15/2039; G03G 15/2042; G03G 15/2046; G03G 15/2053; G03G 2215/2003
See application file for complete search history.

(56) References Cited

U.S. PATENT DOCUMENTS

2021/0033999 A1* 2/2021 Uekawa ............. G03G 15/2028
2022/0382188 A1* 12/2022 Honke .............. G03G 15/2039

FOREIGN PATENT DOCUMENTS

JP 2005-221575 A 8/2005

* cited by examiner

*Primary Examiner* — Thomas S Giampaolo, II
(74) *Attorney, Agent, or Firm* — ScienBiziP, P.C.

(57) ABSTRACT

A heating member for heating a fixing member includes plural heat generation blocks, each of which generates heat when being energized. The plural heat generation blocks are provided side by side along a width direction that is orthogonal to a conveyance direction of a recording medium, and a length in the width direction of at least one of the plural heat generation blocks is equal to or shorter than a minimum difference of a length in the width direction between the recording media in adjacent standard sizes in an order of length in the width direction among the recording media to be conveyed in plural types of the standard sizes.

11 Claims, 28 Drawing Sheets

FIG. 3

<table>
<tr><th>STANDARD SIZE</th><th>LENGTH IN WIDTH DIRECTION [mm]</th><th>DIFFERENCE IN CENTER REFERENCE [mm]</th></tr>
<tr><td rowspan="2">A3 VERTICAL · A4 HORIZONTAL</td><td rowspan="2">L(m)=297 (m=6)</td><td></td></tr>
<tr><td rowspan="2">d(m−1)=40/2=20</td></tr>
<tr><td rowspan="2">B4 VERTICAL · B5 HORIZONTAL</td><td rowspan="2">L(5)=257</td></tr>
<tr><td rowspan="2">d(4)=47/2=23.5</td></tr>
<tr><td rowspan="2">A4 VERTICAL · A5 HORIZONTAL</td><td rowspan="2">L(4)=210</td></tr>
<tr><td rowspan="2">d(3)=28/2=14</td></tr>
<tr><td rowspan="2">B5 VERTICAL</td><td rowspan="2">L(3)=182</td></tr>
<tr><td rowspan="2">d(2)=34/2=17</td></tr>
<tr><td rowspan="2">A5 VERTICAL</td><td rowspan="2">L(2)=148</td></tr>
<tr><td rowspan="2">d(1)=48/2=24</td></tr>
<tr><td rowspan="2">POSTCARD VERTICAL</td><td rowspan="2">L(1)=100</td></tr>
<tr><td></td></tr>
</table>

FIG. 8

<table>
<tr><th>STANDARD SIZE</th><th>LENGTH IN WIDTH DIRECTION [mm]</th><th>DIFFERENCE IN CENTER REFERENCE [mm]</th></tr>
<tr><td rowspan="2">A3 VERTICAL · A4 HORIZONTAL</td><td rowspan="2">L(m)=297 (m=7)</td><td></td></tr>
<tr><td rowspan="2">d(m-1)=18/2=9</td></tr>
<tr><td rowspan="2">11 × 17 VERTICAL · 8.5 × 11 HORIZONTAL</td><td rowspan="2">L(6)=279</td></tr>
<tr><td rowspan="2">d(5)=22/2=11</td></tr>
<tr><td rowspan="2">B4 VERTICAL · B5 HORIZONTAL</td><td rowspan="2">L(5)=257</td></tr>
<tr><td rowspan="2">d(4)=47/2=23.5</td></tr>
<tr><td rowspan="2">A4 VERTICAL · A5 HORIZONTAL</td><td rowspan="2">L(4)=210</td></tr>
<tr><td rowspan="2">d(3)=28/2=14</td></tr>
<tr><td rowspan="2">B5 VERTICAL</td><td rowspan="2">L(3)=182</td></tr>
<tr><td rowspan="2">d(2)=34/2=17</td></tr>
<tr><td rowspan="2">A5 VERTICAL</td><td rowspan="2">L(2)=148</td></tr>
<tr><td rowspan="2">d(1)=48/2=24</td></tr>
<tr><td rowspan="2">POSTCARD VERTICAL</td><td rowspan="2">L(1)=100</td></tr>
<tr><td></td></tr>
</table>

FIG. 10

<table>
<tr><th>STANDARD SIZE</th><th>LENGTH IN WIDTH DIRECTION [mm]</th><th>DIFFERENCE IN CENTER REFERENCE [mm]</th></tr>
<tr><td rowspan="2">A3 VERTICAL · A4 HORIZONTAL</td><td rowspan="2">L(m)=297 (m=9)</td><td></td></tr>
<tr><td rowspan="2">d(m−1)=18/2=9</td></tr>
<tr><td rowspan="2">11 × 17 VERTICAL · 8.5 × 11 HORIZONTAL</td><td rowspan="2">L(8)=279</td></tr>
<tr><td rowspan="2">d(7)=22/2=11</td></tr>
<tr><td rowspan="2">B4 VERTICAL · B5 HORIZONTAL</td><td rowspan="2">L(7)=257</td></tr>
<tr><td rowspan="2">d(6)=41/2=20.5</td></tr>
<tr><td rowspan="2">8.5 × 11 VERTICAL · 5.5 × 8.5 HORIZONTAL</td><td rowspan="2">L(6)=216</td></tr>
<tr><td rowspan="2">d(5)=6/2=3</td></tr>
<tr><td rowspan="2">A4 VERTICAL · A5 HORIZONTAL</td><td rowspan="2">L(5)=210</td></tr>
<tr><td rowspan="2">d(4)=28/2=14</td></tr>
<tr><td rowspan="2">B5 VERTICAL</td><td rowspan="2">L(4)=182</td></tr>
<tr><td rowspan="2">d(3)=34/2=17</td></tr>
<tr><td rowspan="2">A5 VERTICAL</td><td rowspan="2">L(3)=148</td></tr>
<tr><td rowspan="2">d(2)=8/2=4</td></tr>
<tr><td rowspan="2">5.5 × 8.5 VERTICAL</td><td rowspan="2">L(2)=140</td></tr>
<tr><td rowspan="2">d(1)=40/2=20</td></tr>
<tr><td rowspan="2">POSTCARD VERTICAL</td><td rowspan="2">L(1)=100</td></tr>
<tr><td></td></tr>
</table>

HEATING MEMBER, FIXING DEVICE, AND IMAGE FORMING APPARATUS

BACKGROUND OF THE INVENTION

Field of the Invention

The present disclosure relates to a heating member, a fixing device, and an image forming apparatus such as a copier, a multifunction peripheral, a printer, or a facsimile machine.

Description of the Background Art

Since an electrophotographic image forming apparatus can form a high-quality image with favorable reproducibility and operability at low cost, the electrophotographic image forming apparatus is widely used as an apparatus such as a copier, a printer, a facsimile machine, or a multifunction peripheral having two or more functions of these.

The electrophotographic image forming apparatus includes, for example, a photoreceptor (image carrier), a charging device, an exposure device, a developing device, a transfer device, and a fixing device.

Some of the fixing devices provided in the image forming apparatuses include a heating member (for example, a heating member that includes a heating element with a positive temperature characteristic) for heating a fixing member (for example, a fixing roller or a fixing belt). For example, the fixing device that includes the heating member, the fixing member, and a pressure roller is generally used. The fixing member is heated by the heating member and heats and melts toner constituting an unfixed toner image on a recording medium (a recording material) such as recording paper to fix the toner onto the recording medium. The pressure roller is provided to pressure-contact the fixing member, and promotes fixing of the melted toner to the recording medium by pressing the recording medium. The recording medium carrying the unfixed toner image is introduced into a fixing nip, which is an abutment between the fixing member and the pressure roller, such that a toner image carrying surface is brought into contact with a surface of the fixing member. Then, the recording medium is heated and pressurized, whereby the unfixed toner image is fixed.

In recent years, energy saving of the fixing device has been requested for environmental protection, and the fixing device with a short warm-up time from power-on to time at which the image forming apparatus becomes ready for printing has actively been developed. Examples of a method for shortening the warm-up time are improving thermal conversion efficiency by the heating member and reducing heat capacity of the fixing member.

For example, a conventional heater lamp such as a halogen lamp has been used as a device for improving the heat efficiency of the heating member. However, in the case of the heater lamp, since energy loss during the thermal conversion cannot be avoided, a planar heater in which a resistance heating layer is formed on an insulating substrate has been used. Furthermore, a thin fixing belt may be used to reduce the heat capacity of the fixing member.

Just as described, while a temperature increase characteristic of the fixing member is improved by combining the fixing member with the low heat capacity and a high-efficient heat source, temperature control with high accuracy in the longitudinal direction of the heating member is required along with the improvement.

In this regard, a heating member that includes a heat generator has conventionally been known, and the heat generator includes plural heat generation blocks that generate heat by energization.

In detail, the following configuration is described in the prior art. In the configuration, plural magnetic cores (heat generation blocks) include: magnetic cores A, each of which is made of a material having the higher Curie temperature than a temperature of the magnetic core during image fixing and lower than a heat-resistant temperature of an exciting coil; and magnetic cores B, each of which is made of a material having the higher Curie temperature than that of the magnetic core A, and the magnetic cores A and the magnetic cores B are arranged regularly and repeatedly on the same straight line.

However, the conventional configuration has the following disadvantage. This disadvantage will be described below with reference to FIG. 13.

FIG. 13 is a plan view illustrating a schematic configuration of plural heat generation blocks B(1) to B(n) (n is an integer of 2 or larger, and n=14 in this example) in a heating member 42X of the related art. Hereinafter, a description will be made on, as an example, a case where m types (m is an integer of 2 or larger, and m=6 in this example) of the recording media in standard sizes [S(1) to S(m)] of a centimeter system are conveyed with a center in a width direction W as a reference (a center reference C).

Here, lengths [L(1) to L(m) (m=6)] of the m types of the recording media in the standard sizes [S(1) to S(m) (m=6)] in the width direction W, which is orthogonal to a conveyance direction T, are as follows.

More specifically, a first length L(1) is a length (100 mm) in the width direction W of the recording medium in a post card size in vertical arrangement [a post card vertical size S(1)]. A second length L(2) is a length (148 mm) in the width direction W of the recording medium in an A5 size in the vertical arrangement [an A5 vertical size S(2)]. A third length L(3) is a length (182 mm) in the width direction W of the recording medium in a B5 size in the vertical arrangement [a B5 vertical size S(3)]. A fourth length L(4) is a length (210 mm) in the width direction W of the recording medium in the A5 size in horizontal arrangement [an A5 horizontal size] and the recording medium in an A4 size in the vertical arrangement [an A4 vertical size S(4)]. A fifth length L(5) is a length (257 mm) in the width direction W of the recording medium in the B5 size in the horizontal arrangement [a B5 horizontal size] and the recording medium in a B4 size in the vertical arrangement [a B4 vertical size S(5)]. A sixth length L(m) is a sixth length (297 mm) in the width direction W of the recording medium in the A4 size in the horizontal arrangement [an A4 horizontal size] and the recording medium in an A3 size in the vertical arrangement [an A3 vertical size S(m) (m=6)].

As illustrated in FIG. 13, of the heat generation blocks B(1) to B(14) in the heating member 42X, the four heat generation blocks B(6) to B(9) in the center only have recording-medium passing areas a for all of the m types (six types in this example) of the recording media in the standard sizes S(1) to S(6) in the respective heat generation blocks B(6) to B(9). Meanwhile, in the five heat generation blocks B(1) to B(5) on one side and the five heat generation blocks B(10) to B(14) on the other side in the width direction W, the recording-medium passing areas a and the non-passing areas B for the recording media of the standard sizes S(1) to S(6) are mixed in each of the heat generation blocks B(1) to B(5) and B(10) to B(14), which causes unevenness of the temperature (a temperature increase at ends) in these blocks.

Then, thermal damage due to a temperature difference (deviation of the heat or the temperature unevenness) between the passing area α and the non-passing area β of the recording medium in each of the heat generation blocks B(1) to B(5) and B(10) to B(14) is increased. As a result, a reduction in durability of the heating member 42X and damage to and a reduction in durability of the fixing member occur.

In view of the above, an object of the present disclosure is to provide a heating member, a fixing device, and an image forming apparatus capable of suppressing the number of heat generation blocks, in which unevenness of a temperature occurs due to passing of an end of a recording medium in a width direction that is orthogonal to a conveyance direction of the recording medium, and thereby improving durability of the heating member.

SUMMARY OF THE INVENTION

In order to solve the above problem, a heating member according to the present disclosure is a heating member for heating a fixing member, and includes plural heat generation blocks, each of which generates heat when being energized. The plural heat generation blocks are provided side by side along a width direction that is orthogonal to a conveyance direction of a recording medium, and a length in the width direction of at least one of the plural heat generation blocks is equal to or shorter than a minimum difference of a length in the width direction between the recording media in adjacent standard sizes in an order of length in the width direction among the recording media to be conveyed in plural types of the standard sizes.

A fixing device according to the present disclosure includes the heating member according to the present disclosure.

An image forming apparatus according to the present disclosure includes the fixing device according to the present disclosure.

According to the present disclosure, it is possible to reduce the number of the heat generation blocks, a temperature of each of which becomes uneven due to passing of an end of the recording medium in the width direction that is orthogonal to a conveyance direction of the recording medium. Therefore, it is possible to improve durability of the heating member.

BRIEF DESCRIPTION OF THE DRAWINGS

FIG. 3 is a table illustrating lengths in a width direction of recording media in standard sizes of a centimeter system and minimum difference of the length in the width direction between two each of the recording media in the adjacent standard sizes in an order of length in the width direction.

FIG. 8 is a table illustrating the minimum difference when a standard size (11×17 vertical·8.5×11 horizontal size) of an inch system is included in the table illustrated in FIG. 3.

FIG. 10 is a table illustrating the minimum difference when a standard size (8.5×11 vertical·5.5×8.5 horizontal size, and 5.5×8.5 vertical size) of the inch system is included in the table illustrated in FIG. 8.

DESCRIPTION OF THE PREFERRED EMBODIMENTS

Figure 1:
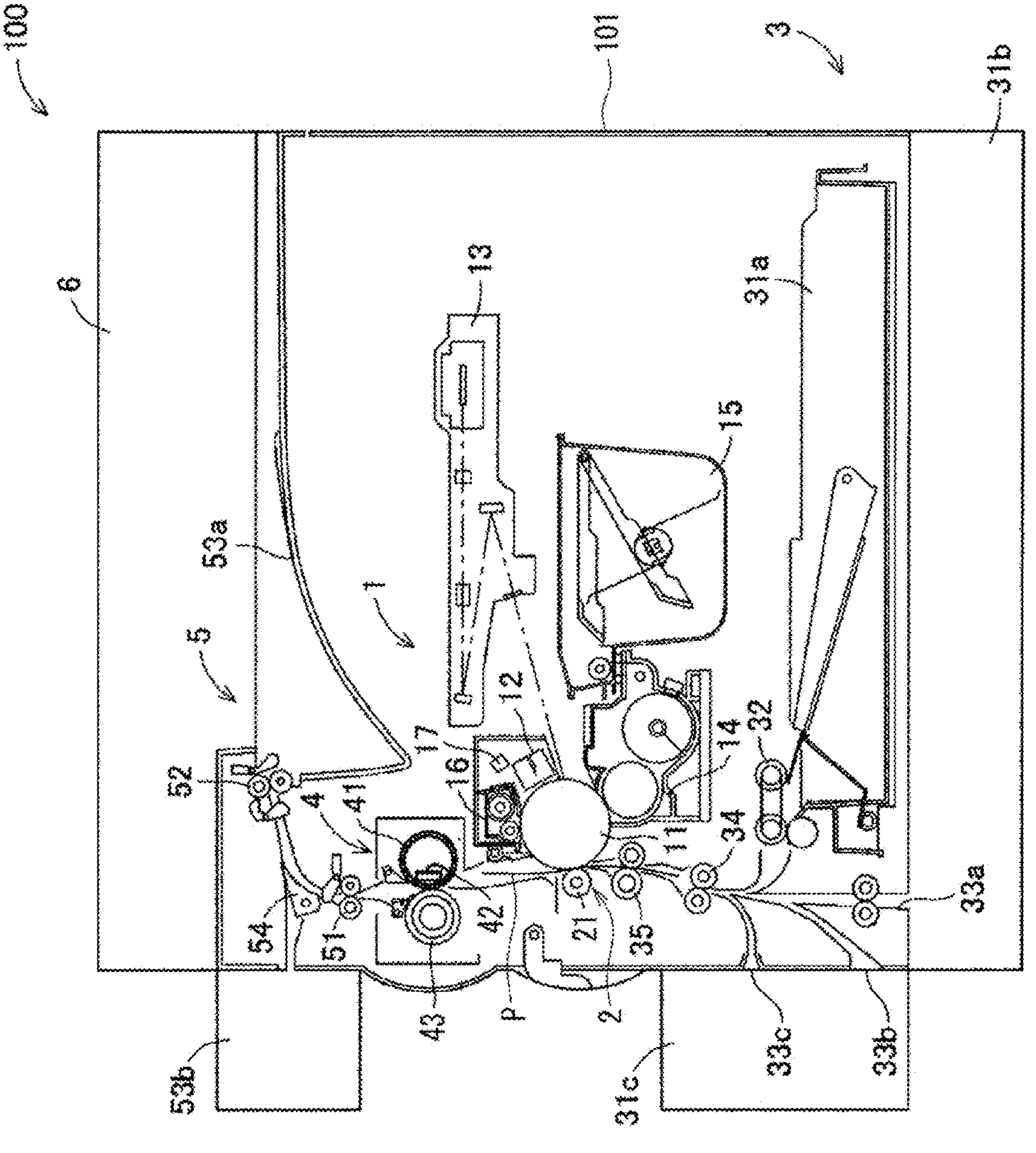
FIG. 1 is a cross-sectional view illustrating a schematic configuration of an image forming apparatus that includes a fixing device according to the present embodiment.

Hereinafter, a description will be made on embodiments according to the present disclosure with reference to the drawings. In the following description, the same components are denoted by the same reference numerals. Names and functions thereof are also the same. Thus, the detailed description thereon will not be repeated.

Image Forming Apparatus

FIG. 1 is a cross-sectional view illustrating a schematic configuration of an image forming apparatus 100 that includes a fixing device 4 according to the present embodiment.

The image forming apparatus 100 according to the present embodiment is a multifunction peripheral that has a copier function, a scanner function, a facsimile function, and a printer function, and includes an image reader 6. The image forming apparatus 100 transmits an image of a document, which is read by the image reader 6, to the outside and forms the image of the document, which is read by the image reader 6, or an image received from the outside on a recording medium P such as recording paper. The image forming apparatus 100 is a monochrome image forming apparatus. However, the image forming apparatus 100 may be a color image forming apparatus (more specifically, a color multifunction peripheral).

The image reader 6 reads the document that is placed on an unillustrated document placement table by scanning the document using an unillustrated optical scanning system, or reads the document that is conveyed by an unillustrated document conveyor, and thereby generates image data.

The image forming apparatus 100 includes an image forming device 1, a transfer device 2, a recording medium supply device 3, the fixing device 4, and an ejection device 5, and fixes an unfixed toner image onto the recording medium P by the fixing device 4.

The image forming device 1 includes a photoreceptor drum 11 (an image carrier), a charging device 12, an exposure device 13 (an optical scanning unit), a developing device 14, a toner replenishing container 15, a drum cleaning device 16, and a photoreceptor static eliminator 17.

An electrostatic latent image that corresponds to image information is formed on a surface of the photoreceptor drum 11. The photoreceptor drum 11 is supported by an image forming apparatus body 101 such that the photoreceptor drum 11 can rotationally be driven about an axis by an unillustrated drive device (a drive motor). The photoreceptor drum 11 has a photoreceptor layer and acts as an image carrier that carries the electrostatic latent image, that is, the toner image on a surface of the photoreceptor layer.

As the photoreceptor drum 11, for example, a photoreceptor drum that includes a conductive base body and the photoreceptor layer can be used. The conductive base body is made of aluminum or the like, and the photosensitive layer is formed on a surface of the conductive base body. As the conductive base body, a cylindrical, columnar, or sheet-like conductive base body can be used. Of these, the cylindrical conductive base body can preferably be used. Examples of the photoreceptor layer are an organic photoreceptor layer and an inorganic photoreceptor layer.

The charging device 12 charges the surface of the photoreceptor drum 11 uniformly. The exposure device 13 irradiates the charged surface of the photoreceptor drum 11 with laser light (signal light), which corresponds to the image information generated as a digital signal, and forms the electrostatic latent image, which corresponds to the image information, on the surface of the photoreceptor drum 11. The developing device 14 supplies toner to the surface of the photoreceptor drum 11, develops the electrostatic latent image on the surface of the photoreceptor drum 11, and thereby forms the toner image. The toner replenishing container 15 stores the toner and replenishes a developing tank in the developing device 14 with the toner according to a toner consumption status of the developing device 14.

The transfer device 2 includes a transfer member 21 (a transfer roller in this example) that can rotationally be driven about an axis by the unillustrated drive device (the drive motor). The transfer member 21 transfers the toner image, which is formed on the surface of the photoreceptor drum 11, to the recording medium P, which is supplied by the recording medium supply device 3. The transfer device 2 conveys the recording medium P, which carries the toner image (the unfixed toner image), to the fixing device 4.

The recording medium supply device 3 includes recording medium cassettes 31*a*, 31*b*, 31*c*, a pickup roller 32, a conveyance roller 34, and a paper stop roller 35. The recording medium cassettes 31*a*, 31*b*, 31*c* each store the recording medium P. Examples of the recording medium P are plain paper, coated paper, color copy paper, an OHP film, and a postcard. Here, standard sizes of the recording medium P of a centimeter system (for example, Japanese specifications and European specifications) include sizes defined in ISO 216 A series and B series, such as A3, A4, B4, and B5 sizes and a postcard size. In addition, standard sizes of the recording medium P of an inch system (for example, the U.S. specifications) include, for example, double letter size: 11×17 inches (279×432 mm), letter size: 8.5×11 inches (216×279 mm), half letter size: 5.5×8.5 inches (140×216 mm), and the like.

The pickup roller 32 feeds the recording media P one by one to the conveyance roller 34. The recording medium P that is stored in the recording medium cassette 31*a* is fed to the conveyance roller 34 by the pickup roller 32. The recording medium P that is stored in the recording medium cassette 31*b* is fed to the conveyance roller 34 through a recording medium acceptance slot 33*a*. The recording medium P that is stored in the recording medium cassette 31*c* is fed to the conveyance roller 34 through a recording medium acceptance slot 33*b* or a recording medium acceptance slot 33*c*. The conveyance roller 34 feeds the recording medium P to the paper stop roller 35. The paper stop roller 35 feeds the recording medium P to a transfer nipper in synchronization with timing at which the toner image on the photoreceptor drum 11 is conveyed to the transfer nipper where the photoreceptor drum 11 abuts the transfer member 21.

After the toner image on the surface of the photoreceptor drum 11 is transferred to the recording medium P, the drum cleaning device 16 removes and collects the toner that remains on the surface of the photoreceptor drum 11. The photoreceptor static eliminator 17 eliminates static electricity on the surface of the photoreceptor drum 11 after the toner is collected by the drum cleaning device 16.

The fixing device 4 pressurizes the unfixed toner image on the recording medium P, which is conveyed from the transfer device 2, while heating and melting the unfixed toner image, and thereby fixes the toner image onto the recording medium P. In addition, the fixing device 4 conveys the recording medium P, onto which the toner image is fixed, to the ejection device 5.

The fixing device 4 includes a fixing belt 41 (an example of a fixing member), a heating member 42, and a pressure roller 43. The fixing belt 41, the heating member 42, and the pressure roller 43 will be described in detail below.

The ejection device 5 includes a conveyance roller 51, an ejection roller 52, storages 53*a*, 53*b*, and a switching gate 54. The conveyance roller 51 conveys the recording medium P, which is conveyed from the fixing device 4, to the ejection roller 52. The ejection roller 52 ejects the recording medium P, which is conveyed from the conveyance roller 51, to the storage 53*a* or the storage 53*b*. The storages 53*a*, 53*b* each store the recording medium P, onto which the toner image is fixed. The switching gate 54 selectively switches an ejection destination of the recording medium P, which is conveyed by the ejection roller 52, between the storage 53*a* and the storage 53*b*.

Fixing Device

Figure 2:
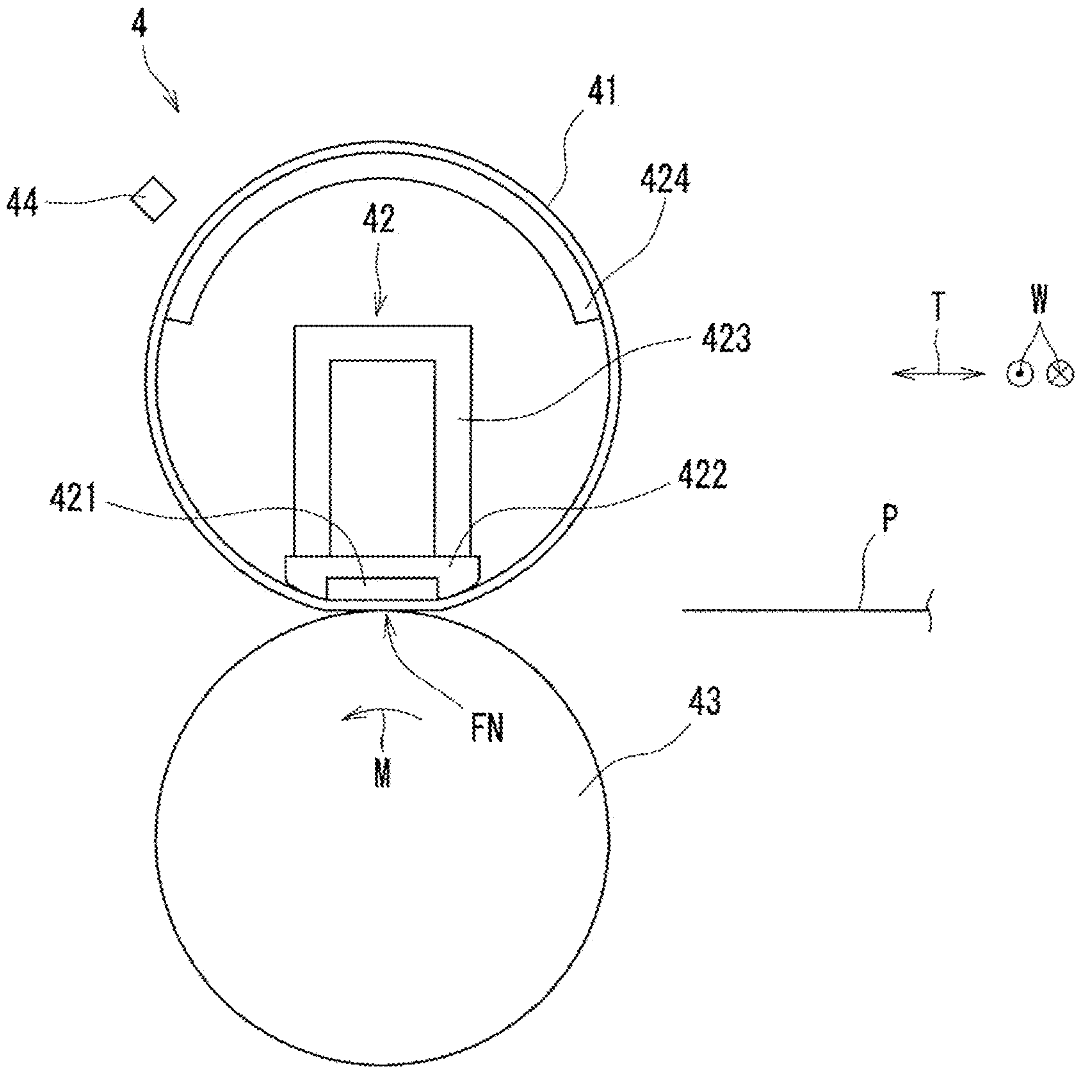
FIG. 2 is a cross-sectional view schematically illustrating a configuration of an example of the fixing device according to the present embodiment.

FIG. 2 is a cross-sectional view illustrating a schematic configuration of an example of the fixing device 4 according to the present embodiment.

As illustrated in FIG. 2, the fixing device 4 includes: the fixing member (such as a fixing roller or a fixing belt, the fixing belt 41 in this example) that is supported to be rotatable about a rotation axis; a pressure member (the pressure roller 43 in this example) that rotates while pressure-contacting the fixing member in parallel therewith; the heating member 42 (a heat source) that heats the fixing member (41); a power supply device (not illustrated) that supplies electric power to the heating member 42; a controller (not illustrated) that controls the power supply device; and a temperature detector 44 for detecting a temperature of a surface of the fixing member (41). The fixing device 4 sandwiches the recording medium P, to which the toner image is transferred, between the fixing member (41) and the pressure member (43), then heats and pressurizes the recording medium P, and fixes the toner image onto the recording medium P.

More specifically, the fixing member is the fixing belt 41. The fixing belt 41 is an endless (annular) flexible belt. The fixing belt 41 can rotate about the rotation axis in an orthogonal direction (a width direction W) that is orthogonal to a conveyance direction T of the recording medium P.

In an example of the fixing belt 41, an elastic layer (a silicone rubber layer, for example) having a predetermined thickness (about 100 μm to 500 μm, for example) is provided on a base material that is made of a flexible heat-resistant material, such as polyimide, and has a predetermined thickness (about 30 μm to 200 μm, for example), and a release layer (a fluororesin layer, for example) having a predetermined thickness (about 10 μm to 50 μm, for example) is further formed on the elastic layer. More specifically, examples of the fixing belt 41 can include: a fixing belt in which a PFA tube is provided on the silicone rubber layer; and a fixing belt in which a fluororesin is applied to the silicone rubber layer. In this example, the silicone rubber layer having a thickness of 300 μm is provided on the base material having an inner diameter of 30 mm and a thickness of 50 μm, and is further covered with the PFA tube having a thickness of 30 μm.

The fixing belt 41 is heated to a predetermined fixing temperature (180° C., for example) by the heating member 42.

The heating member 42 includes a heat generator 421 (a heater), a holder 422 (a heater holder) that holds the heat generator 421, a reinforcement 423 (a stay) that reinforces the holder 422, and a belt guide member 424. The heat generator 421, the holder 422, the reinforcement 423, and the belt guide member 424 are provided on an inner side of the fixing belt 41.

The fixing device 4 further includes the temperature detector 44 (a thermistor) that detects the surface temperature of the fixing belt 41. Based on a detection result of the surface temperature of the fixing belt 41 by the temperature detector 44, the fixing device 4 controls electric power supply to the heat generator 421 such that the surface temperature of the fixing belt 41 becomes equal to a predetermined fixing temperature (180° C., for example). A detailed configuration of the heat generator 421 will be described below.

The holder 422 is formed in a long plate shape extending in the width direction W (a direction of the rotation axis of the fixing belt 41), which is along the surface of the recording medium P and is orthogonal to the conveyance direction T of the recording medium P to be conveyed. The holder 422 is made of a heat-resistant material. A length of the holder 422 is set to be longer than a length of the fixing belt 41 in the width direction W. The holder 422 is provided with the heat generator 421 that heats the fixing belt 41.

In detail, a seating surface for holding the heat generator 421 is provided on a heater attachment surface side of the holder 422. The heat generator 421 is positioned when being fitted to the seating surface. Examples of the material that can be used for the holder 422 can include materials having a heat resistance property and an insulation property such as polyphenylene sulfide (PPS) and a liquid crystal polymer (LCP).

The reinforcement 423 supports the holder 422 while causing the heat generator 421 to abut an inner circumferential surface of the fixing belt 41. Each end of the reinforcement 423 in the width direction W is fixed to a fixing frame (not illustrated). Since the holder 422 is pressed by the pressure roller 43, the reinforcement 423 is a substantially U-shaped stay that is provided on a surface of the holder 422 on an opposite side from the surface on the attachment side of the heat generator 421. The holder 422 is made of a metal member such as stainless steel.

The pressure roller 43 is arranged at a position that opposes the heat generator 421 with the fixing belt 41 being interposed therebetween. The pressure roller 43 rotates about a rotation axis that is parallel to the rotation axis of the fixing belt 41, and extends in parallel with the fixing belt 41. The pressure roller 43 presses the fixing belt 41 toward the heat generator 421 and thereby forms a fixing nip FN between the pressure roller 43 and the fixing belt 41. The pressure roller 43 can be a roller member in which a surface of a cylindrical core material made of metal such as aluminum is covered with an elastic member such as rubber, for example. An outer diameter of the pressure roller 43 is 25 mm in this example, but is not limited thereto.

The pressure roller 43 is rotationally driven by the unillustrated drive device (the drive motor). The pressure roller 43 is rotationally driven when receiving drive power from the drive device. The fixing belt 41 is driven to rotate in conjunction with rotational driving of the pressure roller 43 in a predetermined rotational direction M. In other words, the pressure roller 43 forms the fixing nip FN by abutting the surface of the fixing belt 41, transmits the drive power to the fixing belt 41 via the fixing nip FN, and thereby rotationally drives the fixing belt 41.

The belt guide member 424 is installed in an opposite area of the fixing belt 41 from the fixing nip FN and guides the opposite area of the fixing belt 41 from the fixing nip FN.

The heat generator 421 is provided to slidingly contact the inner circumferential surface of the fixing belt 41. The fixing belt 41 is driven to rotate in conjunction with rotational driving of the pressure roller 43 and thereby slides against the heat generator 421. A lubricant for reducing a frictional force may be applied between a surface of the heat generator 421 and the inner circumferential surface of the fixing belt 41.

The pressure roller 43 is provided in a freely rotatable manner in a state where both ends thereof in the rotational axis direction are supported and the pressure roller 43 presses the fixing belt 41 by an unillustrated pressure mechanism. The pressure roller 43 is rotationally driven when receiving the drive power from the unillustrated drive device (the drive motor).

In the present embodiment, the pressure roller 43 has the core metal, an elastic body layer, and a surface layer. As a material that constitutes the core metal, a metallic material such as aluminum or iron can be used. The elastic body layer is provided on an outer circumferential surface of the core metal. As a material that constitutes the elastic body layer, an elastic material such as silicone rubber or a silicone sponge can be used. The surface layer is provided on an outer circumferential surface of the elastic body layer, and the same material as a material that constitutes a surface layer of the fixing belt 41 can be used for the surface layer. In this example, the pressure roller 43 is a roller having an outer diameter of 25 mm. In the pressure roller 43, a silicone sponge layer having a thickness of 6 mm is provided as the elastic body layer on the outer circumferential surface of the core metal having an outer diameter of 13 mm, and a PFA tube layer having a thickness of 30 μm is further provided as the surface layer on an outer circumferential surface of the elastic body layer.

First Embodiment

First Embodiment—1

Figure 4:
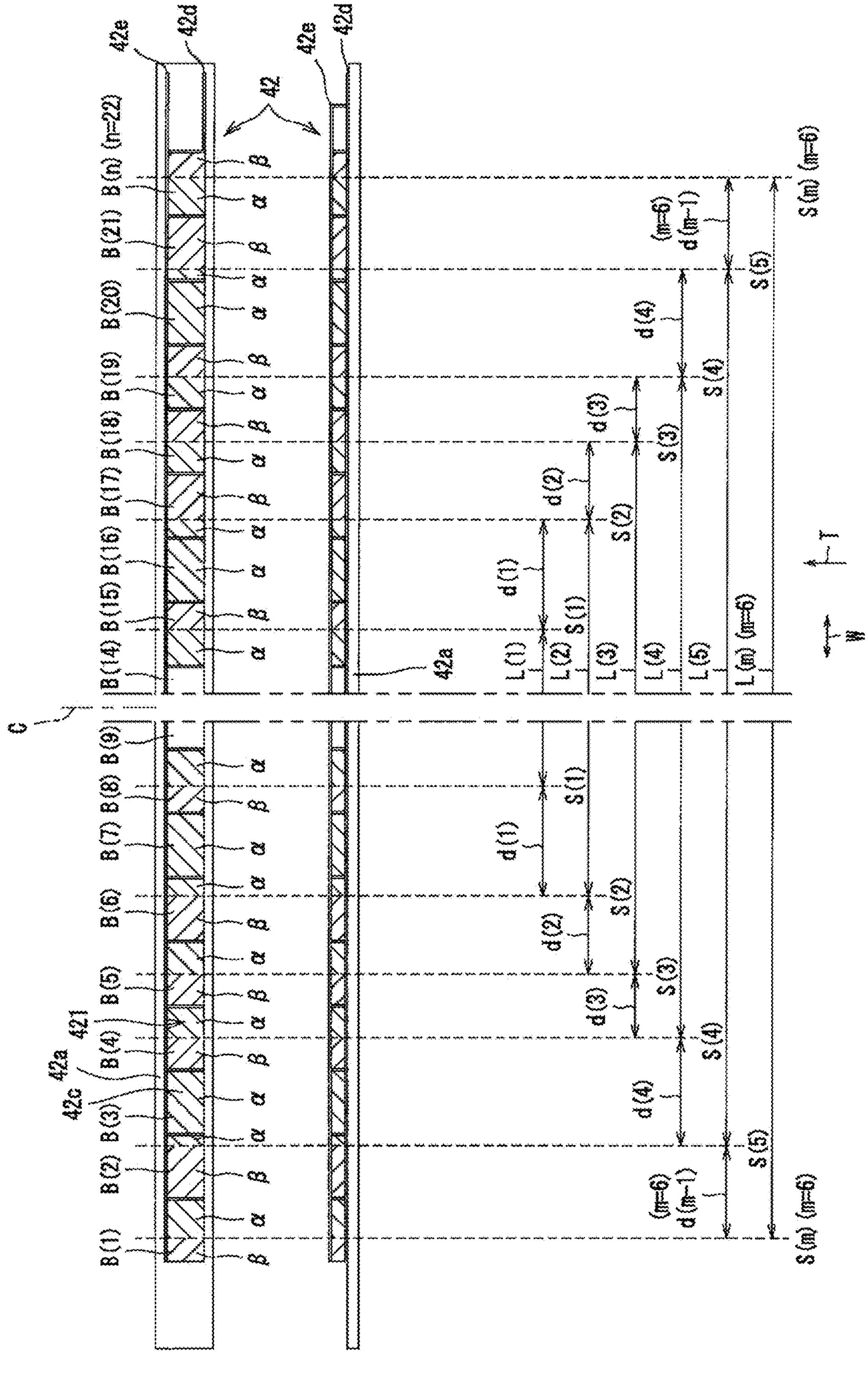
FIG. 4 includes a plan view (top) and a side view (bottom) illustrating a configuration example (a first mode) in which an arrangement pitch of heat generation blocks is 14 mm when the minimum difference of the length in the width direction between two each of the recording media illustrated in FIG. 3 is 14 mm.
Figure 5A:
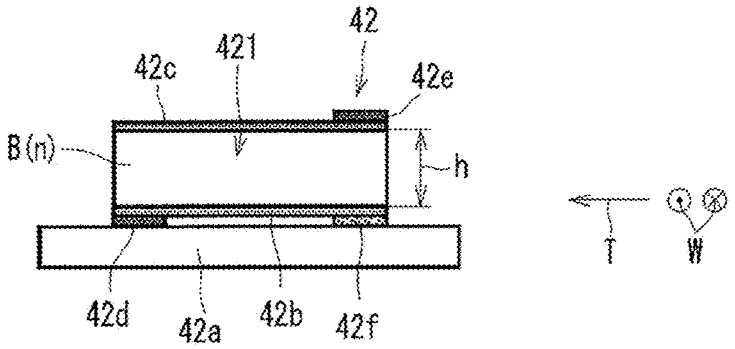
FIG. 5A is an enlarged front view illustrating a part of the heat generation block in a heating member.
Figure 5B:
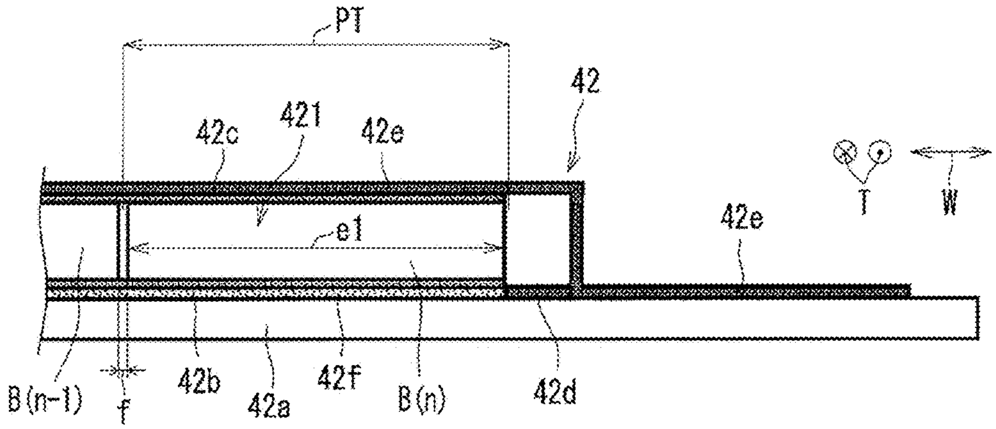
FIG. 5B is an enlarged side view illustrating a part of the heat generation block in the heating member.
Figure 5C:
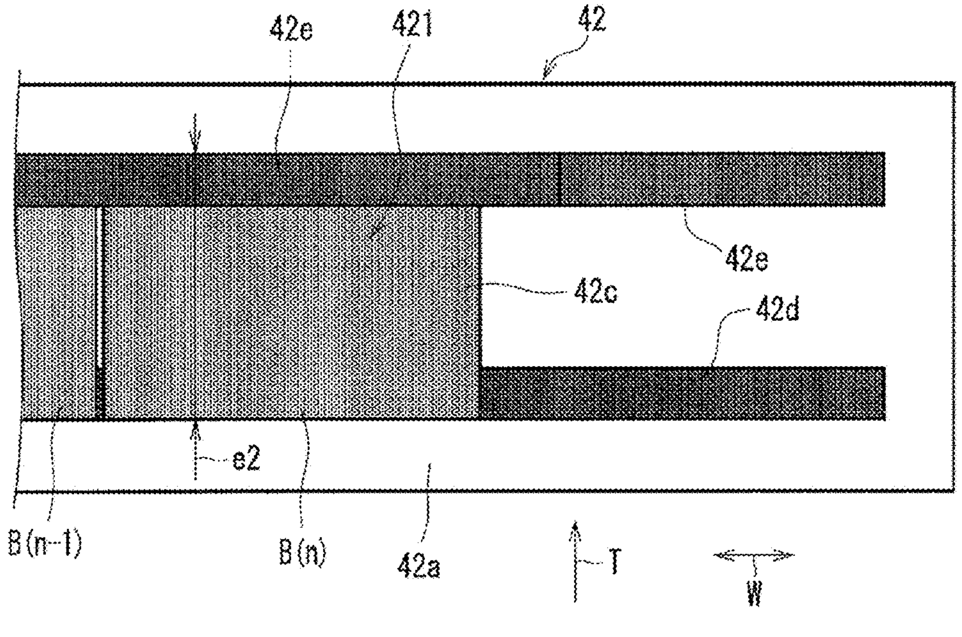
FIG. 5C is an enlarged plan view illustrating a part of the heat generation block in the heating member.

FIG. 3 is a table illustrating lengths [L(1) to L(m)] (m is an integer of 2 or larger, m=6 in this example) in the width direction W of the recording media P in the standard sizes of the centimeter system and a minimum difference [d(3)=(L(4)−L(3))/2=14 mm] of the length in the width direction W between the recording media P, P in the adjacent standard sizes [S(1), S(2)] to [S(m−1), S(m)] in an order of length in the width direction W. FIG. 4 includes a plan view (top) and a side view (bottom) illustrating a configuration example (a first mode) in which an arrangement pitch PT of each of heat generation blocks B(1) to B(n) (n is an integer of 2 or larger) is 14 mm when the minimum difference of the length [L(1) to L(m)] in the width direction W between two each of the recording media P illustrated in FIG. 3 is 14 mm [=d(3)=(L(4)−L(3))/2]. In addition, FIG. 5A to FIG. 5C are enlarged front view, side view, and plan view illustrating a part of the heat generation blocks B(1) to B(n) in the heating member 42, respectively.

In this example, the image forming apparatus 100 conveys the recording medium P with a center in the width direction W of the recording medium P in the standard size being a reference (a center reference C). However, the image forming apparatus 100 may convey the recording medium P with an end on one side in the width direction W of the recording medium P in the standard size being a reference (a one-side reference).

The heating member 42 for heating the fixing member (the fixing belt 41 in this example) includes the plural heat generation blocks B(1) to B(n), each of which generates heat by energization. The plural heat generation blocks B(1) to B(n) are provided side by side in the width direction W.

In the present embodiment, it is assumed that each of the plural heat generation blocks B(1) to B(n) has a positive temperature coefficient (PTC). That is, each of the heat generation blocks B(1) to B(n) can execute self-temperature control in which a resistance value is increased when a temperature thereof exceeds the Curie point, and a PTC heater is a representative example thereof. In this example, each of the heat generation blocks B(1) to B(n) is made by adding strontium titanate ($SrTiO_3$) and lead titanate ($PbTiO_3$) to barium titanate ($BaTiO_3$) as a base. Each of the heat generation blocks B(1) to B(n) has a rectangular parallelepiped shape.

Here, it is requested to ensure safety during an uncontrollable event in which energization of the heating member 42 cannot be cancelled. As a safety measure against such an uncontrollable event, it is effective to use the heat generation block (the PTC heater) that has the positive temperature coefficient and can execute the self-temperature control. The PTC heater is not heated to the Curie temperature or higher since the resistance value thereof is significantly increased near the Curie temperature. Thus, it is possible to ensure the safety during the uncontrollable event in which energization of the heating member 42 cannot be cancelled.

In the present embodiment, the length in the width direction W of at least one (all or some) of the plural heat generation blocks B(1) to B(n) [all the heat generation blocks B(1) to B(n) in this example] is equal to or shorter than the minimum difference [d(3)=(L(4)−L(3))/2=14 mm in this example] of the length [L(1) to L(m)] in the width direction W between the recording media P, P in the adjacent standard sizes [S(1), S(2)] to [S(m−1), S(m)] in the order of length [L(1) to L(m)] in the width direction W of the recording media P to be conveyed in plural types of the standard sizes. In the example illustrated in FIG. 4, each of the lengths in the width direction of the heat generation blocks B(1) to B(n) is 13.5 mm [a clearance f (see FIG. 5B)=0.5 mm] that is shorter than 14 mm of the minimum difference [d(3)], and the number n of the heat generation blocks B(1) to B(n) is 22.

In the present embodiment, a length e1 in the width direction W of at least one (all in this example) of the heat generation blocks B(1) to B(n) is set to be equal to or shorter than the minimum difference [d(3)=(L(4)−L(3))/2=14 mm] (13.5 mm in this example). In this way, at least one [B(3), B(7), B(16), B(20) in this example] of the heat generation blocks B(1) to B(n) does not include a non-passing area β by the recording medium P and can only include a passing area α. In addition, even when any of the plural heat generation blocks B(1) to B(n) includes the non-passing area β, it is possible to reduce the number of the heat generation blocks including the non-passing area β [B(1) to B(2), B(4) to B(6), B(8) to B(15), B(17) to B(19), and B(21) to B(22) in this example) and thus possible to improve durability of the heating member 42 accordingly. Furthermore, the fixed image can be uniformed in the width direction W.

Here, at least one (all or some) of the heat generation blocks B(1) to B(7) or B(1) to B(8) and B(16) to B(n) or B(15) to B(n), each of which is entirely or partially located outside the recording medium P in a minimum size having the shortest length in the width direction W of the recording media P in the plural types of the standard sizes S(1) to S(m) (m=6), may have the length of the minimum difference or shorter. In this way, it is possible to reliably improve the durability of the heating member 42 on the outer side of the recording medium P in the minimum size.

In addition, the heat generation blocks B(9) to B(14) or B(8) to B(15), through each of which the recording medium P in the minimum size in the width direction W of the recording media P in the plural types of the standard sizes S(1) to S(m) (m=6) entirely or partially passes, may constitute a single heat generation block. Furthermore, the number of the heat generation blocks having the minimum difference or shorter may be one-third or larger of, a half or larger of, or the same as the total number of the heat generation blocks. These apply to a second embodiment to a fourth embodiment described below.

In detail, as illustrated in FIG. 5A to FIG. 5C, the heating member 42 includes the heat generation blocks B(1) to B(n) (PTC panels), an insulating substrate 42*a*, a first electrode 42*b*, a second electrode 42*c*, a first conductive wire 42*d*, and a second conductive wire 42*e*. The heating member 42 constitutes the heat generator 421 (the PTC heater) with the heat generation blocks B(1) to B(n).

The insulating substrate 42*a* is a long substrate that extends in the width direction W. A length of the insulating substrate 42*a* is longer than the length of the fixing belt 41 in the width direction W and is shorter than the length of the holder 422.

In the present embodiment, of the first conductive wire 42*d* and the second conductive wire 42*e* for heating the heat generation blocks B(1) to B(n), the first conductive wire 42*d* extends in the width direction W on back surfaces of the heat generation blocks B(1) to B(n) on the insulating substrate 42*a* side, and the second conductive wire 42*e* extends in the width direction W on opposite surfaces thereof from the insulating substrate 42*a*.

In this way, each of the heat generation blocks B(1) to B(n) can generate the heat uniformly in a thick direction and thus further execute the accurate temperature control.

The back surface of each of the heat generation blocks B(1) to B(n) on the insulating substrate 42*a* side and the surface thereof on the opposite side from the insulating substrate 42*a* are respectively formed with the first electrode 42*b* and the second electrode 42*c* for supplying the electric power to the respective surfaces of each of the heat generation blocks B(1) to B(n). In this way, each of the heat generation blocks B(1) to B(n) can generate the heat when being energized via the first electrode 42*b* and the second electrode 42*c*.

The first conductive wire 42*d*, which extends in the width direction W, is formed at an end position on a downstream side or an upstream side (the downstream side in this example) in the conveyance direction T in an area where the heat generation blocks B(1) to B(n) should be arranged on the insulating substrate 42*a*. The second conductive wire 42*e*, which extends in the width direction W, is formed at an end position on the downstream side or the upstream side (the upstream side in this example) in the conveyance direction T on the heat generation blocks B(1) to B(n).

In the area where the heat generation blocks B(1) to B(n) should be arranged on the insulating substrate 42*a*, a raised section 42*f* that extends in the width direction W is formed at an end position on the upstream side or the downstream side (the upstream side in this example) in the conveyance direction T.

In regard to the heat generation blocks B(1) to B(n), the first conductive wire 42*d*, which is provided at the end on the downstream side or the upstream side (the downstream side in this example) in the conveyance direction T of the back surface on the insulating substrate 42*a* side, is provided on the insulating substrate 42*a*. Meanwhile, an end of the back surface on the insulating substrate 42*a* side of each of the heat generation blocks B(1) to B(n) on the downstream side or the upstream side (the upstream side in this example) in the conveyance direction T is provided on the raised section 42*f* on the insulating substrate 42*a*.

This raised section 42*f* may be replaced with a bonding agent such as cement or a heat-resistant adhesive that fixes the heat generation blocks B(1) to B(n) to the insulating substrate 42*a*.

Sizes of the first conductive wire 42*d* and the second conductive wire 42*e* in the conveyance direction T do not have to be increased more than necessary as long as a current caused by the energization can be allowed. Under an allowable current ensuring condition, the sizes of the first conductive wire 42*d* and the second conductive wire 42*e* may each be smaller than a size of each of the heat generation blocks B(1) to B(n) in the conveyance direction T (preferably, a half, more preferably one-third, and further preferably one-fourth of the size of the heat generation block).

The first conductive wire 42*d* extends beyond an end on one side [the heat generation block B(n) side in this example] in the width direction W of the heat generation blocks B(1) to B(n). The second conductive wire 42*e* extends beyond the end on one side [the heat generation block B(n) side in this example] in the width direction W of the heat generation blocks B(1) to B(n), is then bent on the insulating substrate 42*a* side, and further extends outward in the width direction W on the insulating substrate 42*a*.

In the heating member 42, the electric power is supplied from an unillustrated power supply to the first conductive wire 42*d* and the second conductive wire 42*e*. As a result, each of the heat generation blocks B(1) to B(n) generates the heat, and the fixing belt 41 is thereby heated.

For example, in the configuration that the insulating substrate 42*a* is arranged between each of the heat generation blocks B(1) to B(n) and the fixing belt 41, the fixing belt 41 is stably heated with high efficiency and over a long time with the heat generated by the heat generation blocks B(1) to B(n). Thus, in order to obtain low heat capacity and high slidability, the insulating substrate 42*a* may be provided with a sliding layer (a thin glass protection layer in this example) on the sliding surface (the inner circumferential surface) side of the fixing belt 41. Furthermore, it is effective to apply a lubricant or the like between the sliding layer of the insulating substrate 42*a* and the sliding surface of the fixing belt 41. However, the configuration is not limited thereto. Alternatively, a film or a tape having the slidability may be provided on the surface of the insulating substrate 42*a*, on which the fixing belt slides, to ensure the slidability.

In this example, on an alumina substrate that constitutes the insulating substrate 42*a*, the first conductive wire 42*d* such as screen printing is formed by using a conductive material such as silver. Then, on the first conductive wire 42*d*, the plural heat generation blocks B(1) to B(n), each of which is formed with the first electrode 42*b* and the second electrode 42*c* on both of the surfaces, are provided side by side and fixed in the width direction W (a longitudinal direction).

In this example, as illustrated in FIG. 5A to FIG. 5C, in regard to the heat generation blocks B(1) to B(n), the arrangement pitch PT (see FIG. 5B) is 14 mm, the length e1 (see FIG. 5B) in the width direction W (the longitudinal direction) is 13.5 mm, the clearance f (see FIG. 5B) between each adjacent pair of the heat generation blocks [B(1), B(2)], [B(2), B(3)] to [B(20), B(21)], [B(21), B(n) (n=22 in this example)] is 0.5 mm, a distance e2 (see FIG. 5C) in the conveyance direction T (a short direction) is 8 mm, and a thickness h (see FIG. 5A) is 1 mm. Accordingly, the fixing device 4 has a heat generation area of about 308 mm in the width direction W (the longitudinal direction) and thus can handle the recording media P up to the A4 horizontal size/A3 vertical size S(m) at a maximum. Here, the heat generation blocks B(1) to B(n) can be fixed to the insulating substrate 42*a* with cement or the heat-resistant adhesive.

As illustrated in FIG. 4, at least one [B(3), B(7), B(20), B(16) in this example] of the heat generation blocks B(1) to B(n) (n=22) having the minimum difference or shorter is located between the ends of the recording media P, P in the adjacent standard sizes [S(4), S(5)], [S(1), S(2)]. In this way, it is possible to reduce the number of the heat generation blocks [B(3), B(7), B(16), B(20) in this example], each of which is passed by the end of respective one of the recording media P to P in the standard sizes [S(1) to S(m)] and thus has the ununiform temperature.

In the present embodiment, as illustrated in FIG. 4, of the recording media P to P to be conveyed in the standard sizes [S(1) to S(m) (m=6)] of the centimeter system, the minimum difference of the length [L(1) to L(m)] in the width direction W between two each of the recording media P, P in the adjacent standard sizes [S(1), S(2)] to [S(m−1), S(m)] in the order of length in the width direction W is 14 mm (see hatching in FIG. 3). Thus, the length in the width direction W of each of the heat generation blocks B(1) to B(n) (n=22) having the minimum difference or shorter can be 14 mm or shorter, and more preferably, 10 mm or shorter.

Although the clearance f is set to 0.5 mm, the heat generation blocks B(1) to B(n) may be arranged without the clearance. The same applies to the second embodiment to the fourth embodiment described below.

In the example illustrated in FIG. 4, the heating member 42 is not in contact with a portion between each adjacent pair of the heat generation blocks [B(1), B(2)], to [B(21), B(22)]. Accordingly, in the heating member 42, the length e1 in the width direction W of each of the heat generation blocks B(1) to B(22) is set to 13.5 mm, the clearance f between each adjacent pair of the heat generation blocks [B(1), B(2)], to [B(21), B(22)] is set to 0.5 mm, and thus the arrangement pitch PT of the heat generation blocks B(1) to B(22) is set to 14 mm. The heat generation blocks B(1) to B(22) are connected in parallel in an equivalent circuit between the first conductive wire 42*d* and the second conductive wire 42*e*.

As illustrated in FIG. 4, when the recording medium P in the standard size of the centimeter system is conveyed with the center in the width direction W being the reference (the center reference C), the length in the width direction W of each of the heat generation blocks B(1) to B(22) having the minimum difference or shorter is set to 14 mm or shorter (13.5 mm in this example, the clearance f=0.5 mm) due to the fact that the minimum difference is set to 14 mm. Thus, the image forming apparatus 100 can favorably handle the recording media P to P in the standard sizes [S(1), S(2)] to [S(m−1), S(m) (m=6)] of the centimeter system, each of which is conveyed using the center reference C.

First Embodiment—2

Figure 6A:
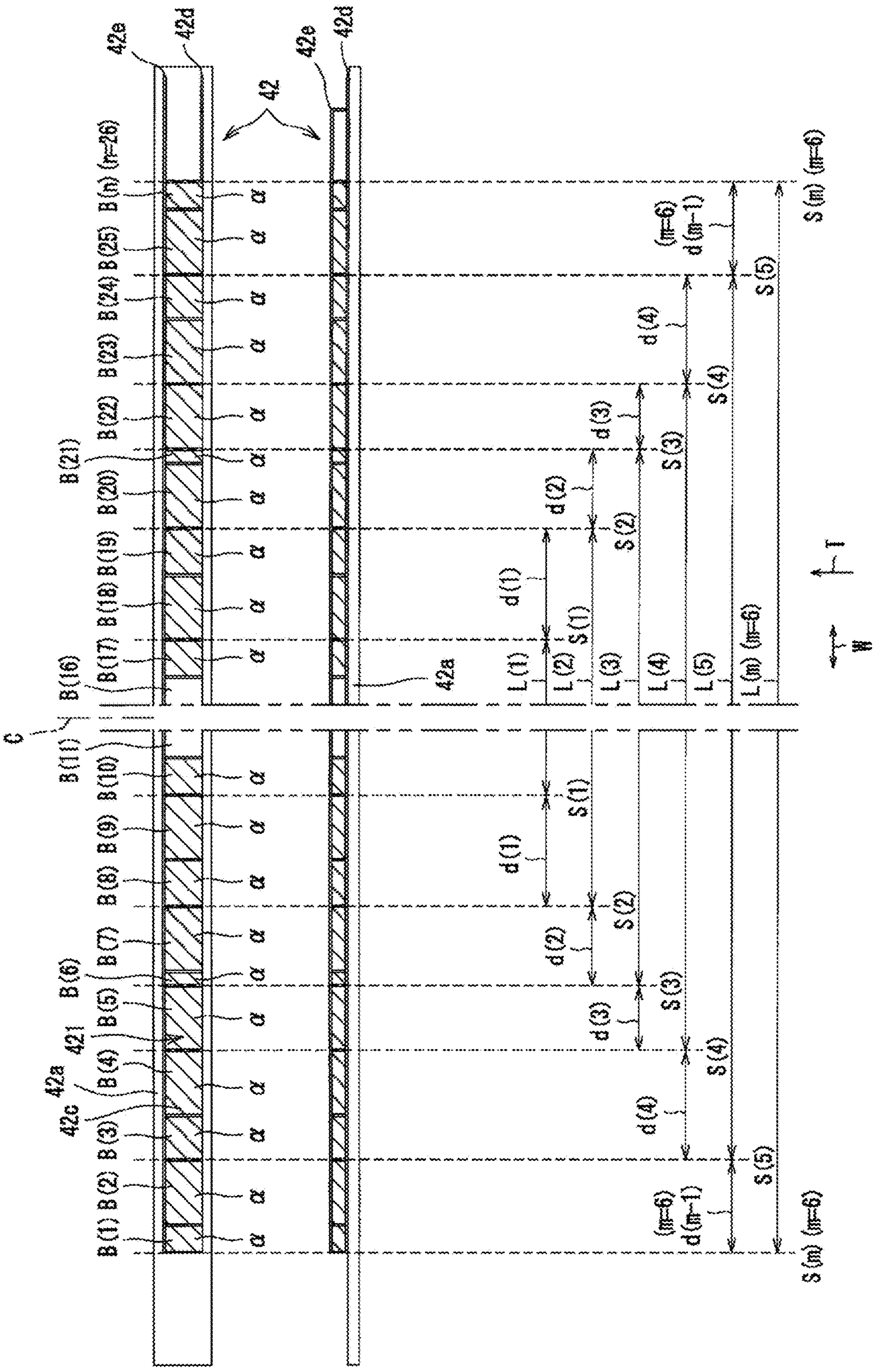
FIG. 6A includes a plan view (top) and a side view (bottom) illustrating another example (a second mode) of the heat generation block illustrated in FIG. 4.

FIG. 6A includes a plan view (top) and a side view (bottom) illustrating another example (a second mode) of the heat generation blocks B(1) to B(n) (n=26 in this example) illustrated in FIG. 4.

In the configuration illustrated in FIG. 4, a configuration illustrated in FIG. 6A is an example in which the non-passing area β is not included in each of the heat generation blocks B(1) to B(n) (n=26) in the heating member 42. Accordingly, the end positions in the width direction W of each of the recording media P in the standard sizes S(1) to S(m) (m=6) match boundary positions between two respective pair of the heat generation blocks B(1) to B(26) or the end positions of the heat generation blocks B(1), B(26) at both ends.

In the present embodiment, the length in the width direction of at least one [B(1), B(3), B(6), B(8), B(10), B(26), B(24), B(21), B(19), B(17) in this example] of the plural heat generation blocks B(1) to B(n) (n=26) differs from the constant (maximum) length (13.5 mm in this example) in the width direction W of each of the other heat generation blocks [B(2), B(4) to B(5), B(7), B(9), B(25), B(23) to B(22), B(20), B(18) in this example] such that the boundary position between each pair of the adjacent heat generation blocks [B(1), B(2)], to [B(25), B(26)] and the outer end position of each of the heat generation blocks B(1), B(26) at both ends in the width direction W are each located at the end (each end in this example) in the width direction W of the recording media P in the plural types of the standard sizes S(1) to S(m).

The constant length in the width direction W of the heat generation block between each pair of the recording media P, P in the adjacent standard sizes [S(1), S(2)] to [S(m−1), S(m)] is set to be as long as possible within the minimum difference [d(3)] or shorter (13.5 mm or shorter in this example). In addition, the number of the heat generation blocks having the constant (maximum) length (13.5 mm in this example) is set to be the largest in each of the differences d(1) to d(m−1).

In the configuration illustrated in FIG. 6A, the ends in the width direction W of each of the recording media P in the standard sizes S(1) to S(m) match joints of the respective two pairs of the heat generation blocks B(1) to B(26) or the ends of the heat generation blocks B(1), B(26) at both ends.

In this way, each of the heat generation blocks B(1) to B(26) does not include the non-passing area β by the recording medium P but only includes the passing area α, and the durability of the heating member 42 can be improved accordingly.

First Embodiment—3

By the way, when the length in the width direction W of each of the heat generation blocks B(1) to B(n) (n=26) having the minimum difference or shorter is shorter than 5 mm, it is difficult to assemble the heat generation blocks B(1) to B(n), which worsens assembly workability.

In this regard, the heating member 42 according to the present embodiment (the first embodiment—1) is configured as follows.

Figure 6B:
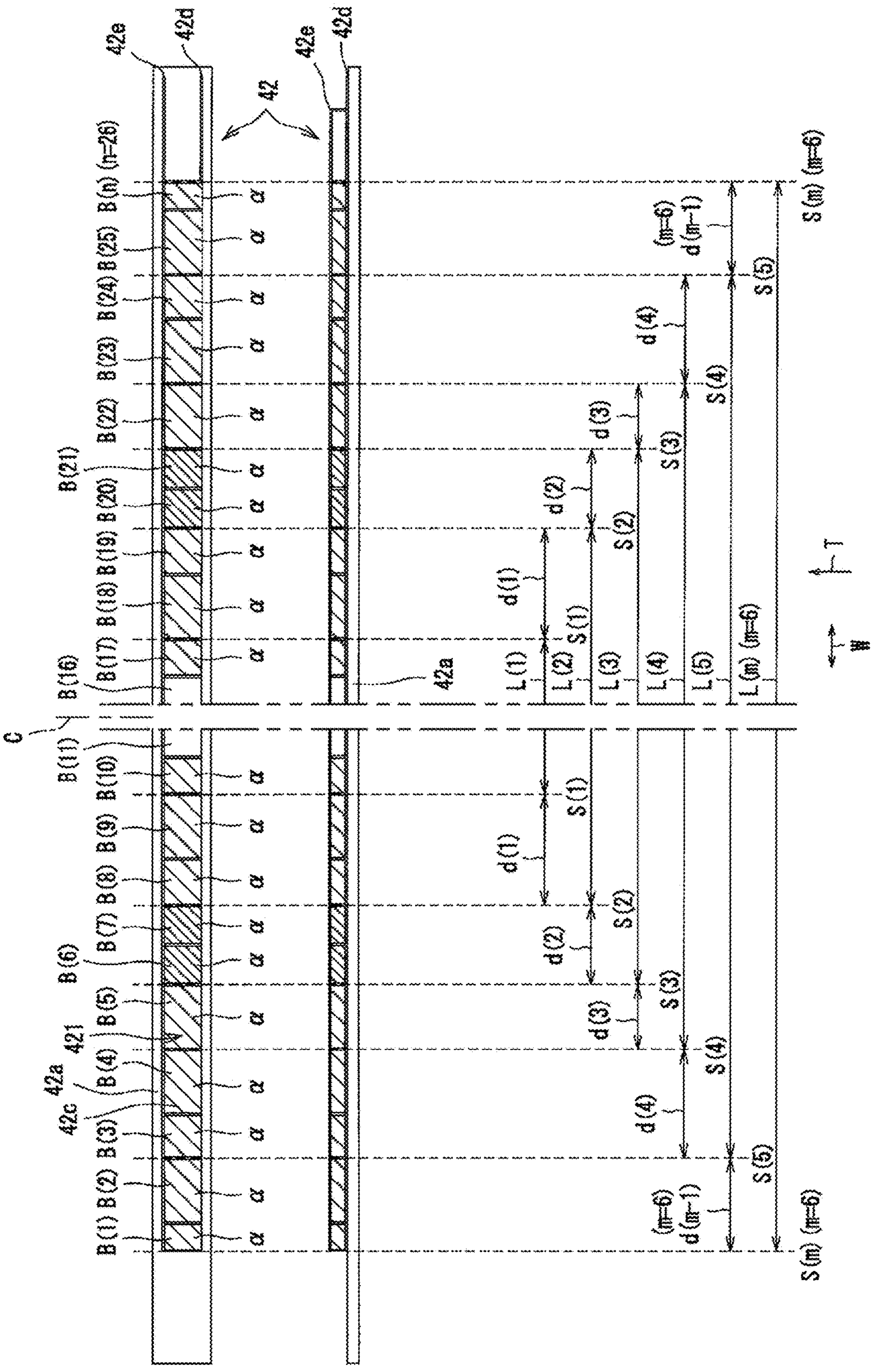
FIG. 6B includes a plan view (top) and a side view (bottom) illustrating an example (a third mode) in which the length in the width direction of the heat generation block having the minimum difference or shorter is 5 mm or longer in the heating member illustrated in FIG. 4.

FIG. 6B includes a plan view (top) and a side view (bottom) illustrating an example (a third mode) in which the length in the width direction W of each of the heat generation blocks B(1) to B(n) (n=26) having the minimum difference or shorter is 5 mm or longer in the heating member 42 illustrated in FIG. 4.

In the heating member 42 illustrated in FIG. 6B, the length in the width direction W of each of the heat generation blocks B(1) to B(26) having the minimum difference or shorter is 5 mm or longer. In this example, in the heating member 42 illustrated in FIG. 6A, the lengths in the width direction W of the heat generation blocks [B(6), B(7)] and [B(21), B(20)], which include the heat generation blocks having the length in the width direction W of 5 mm or shorter, in the difference d(2) between the recording media P, P are equalized.

In the example illustrated in FIG. 6A, the lengths e1 of the heat generation blocks [B(6), B(7)] and [B(21), B(20)] are 2.5 mm and 13.5 mm (the clearance f=0.5 mm), respectively. Meanwhile, in the example illustrated in FIG. 6B, the lengths e1 of the heat generation blocks [B(6), B(7)] and [B(21), B(20)] are each set to be 8.0 mm (the clearance f=0.5 mm), which is 5 mm or longer.

In this way, each of the heat generation blocks B(1) to B(n) can be assembled easily, thereby improving the assembly workability.

First Embodiment—4

By the way, as in the heating member 42 illustrated in FIG. 6A and FIG. 6B, the heat generation blocks may not be provided on outer sides of the heat generation blocks B(1) to B(n) (n=26), through which the recording medium P in the largest size [the A4 horizontal size/the A3 vertical size S(m) in this example] having the longest length in the width direction W passes, of the plural types of the recording media P in the standard sizes S(1) to S(m) (m=6). However, in this case, the temperatures at the ends in the width direction W of the recording medium P are likely to be reduced due to heat dissipation from the heat generation blocks B(1), B(n) (n=26), which are located at the ends in the width direction W, to the fixing member (the fixing belt 41). As a result, fixing failure occurs at the ends in the width direction W of the recording medium P, which may prevent ensuring of a fixing property.

In this regard, the heating member 42 according to the present embodiment (the first embodiment—4) is configured as follows.

Figure 6C:
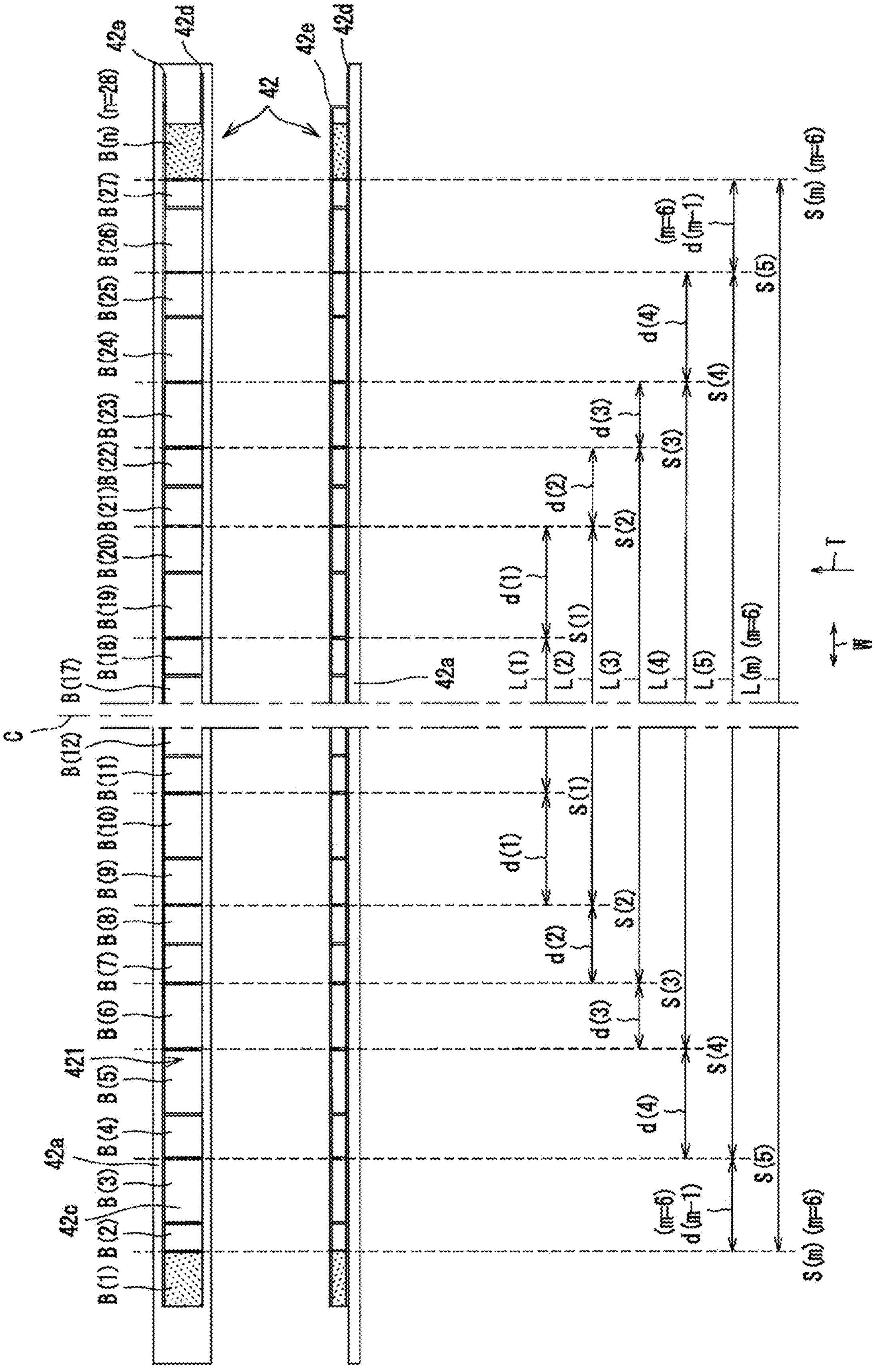
FIG. 6C includes a plan view (top) and a side view (bottom) illustrating an example (a fourth mode) in which the heat generation block is provided at both ends of the recording medium in the width direction in the heating member illustrated in FIG. 6B.

FIG. 6C includes a plan view (top) and a side view (bottom) illustrating an example (a fourth mode) in which the heat generation blocks B(1), B(n) (n=28) are provided at both ends of the recording media P in the width direction W in the heating member 42 illustrated in FIG. 6B.

In the heating member 42 illustrated in FIG. 4, FIG. 6A, and FIG. 6B (FIG. 6B in this example), one, two, or more (one on each side in this example) of the heat generation blocks B(1), B(n) exist on the outer side of the heat generation blocks B(2), B(n−1) (n=28) at the end (at least one of the ends, both ends in this example) in the width direction W of the recording medium P in the maximum size [S(m)] having the longest length in the width direction W of the plural types of the recording media P in the standard sizes S(1) to S(m) (m=6). Here, the heat generation blocks B(2), B(n−1), which correspond to the ends in the width direction W of the recording medium P in the maximum size [S(m)], can each be the heat generation block, through which a half or more of the recording medium P in the maximum size [S(m)] passes.

In this way, it is possible to avoid the reduction in the temperature at the end (both ends) in the width direction W of the recording medium P due to the heat dissipation from the heat generation blocks B(1), B(n) located at the end (both ends in this example) in the width direction W to the fixing member (the fixing belt 41). Accordingly, it is possible to effectively prevent occurrence of the fixing failure at the end (both ends) in the width direction W of the recording medium P and thus to ensure the fixing property.

First Embodiment—5

Figure 6D:
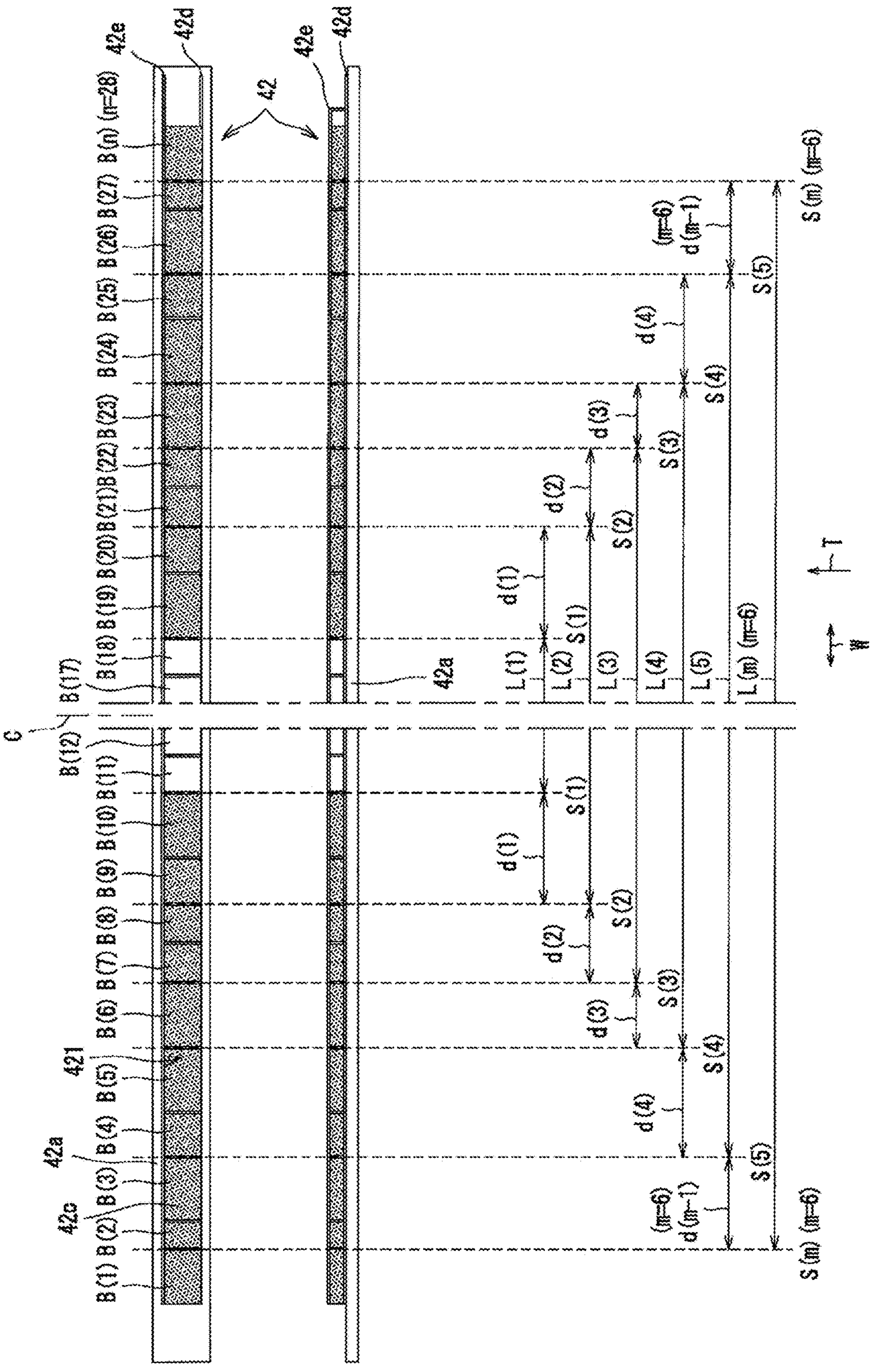
FIG. 6D includes a plan view (top) and a side view (bottom) illustrating an example (a fifth mode) in which the Curie temperature of a second heat generation block is higher than the Curie temperature of a first heat generation block in the heating member illustrated in FIG. 6C.
Figure 6E:
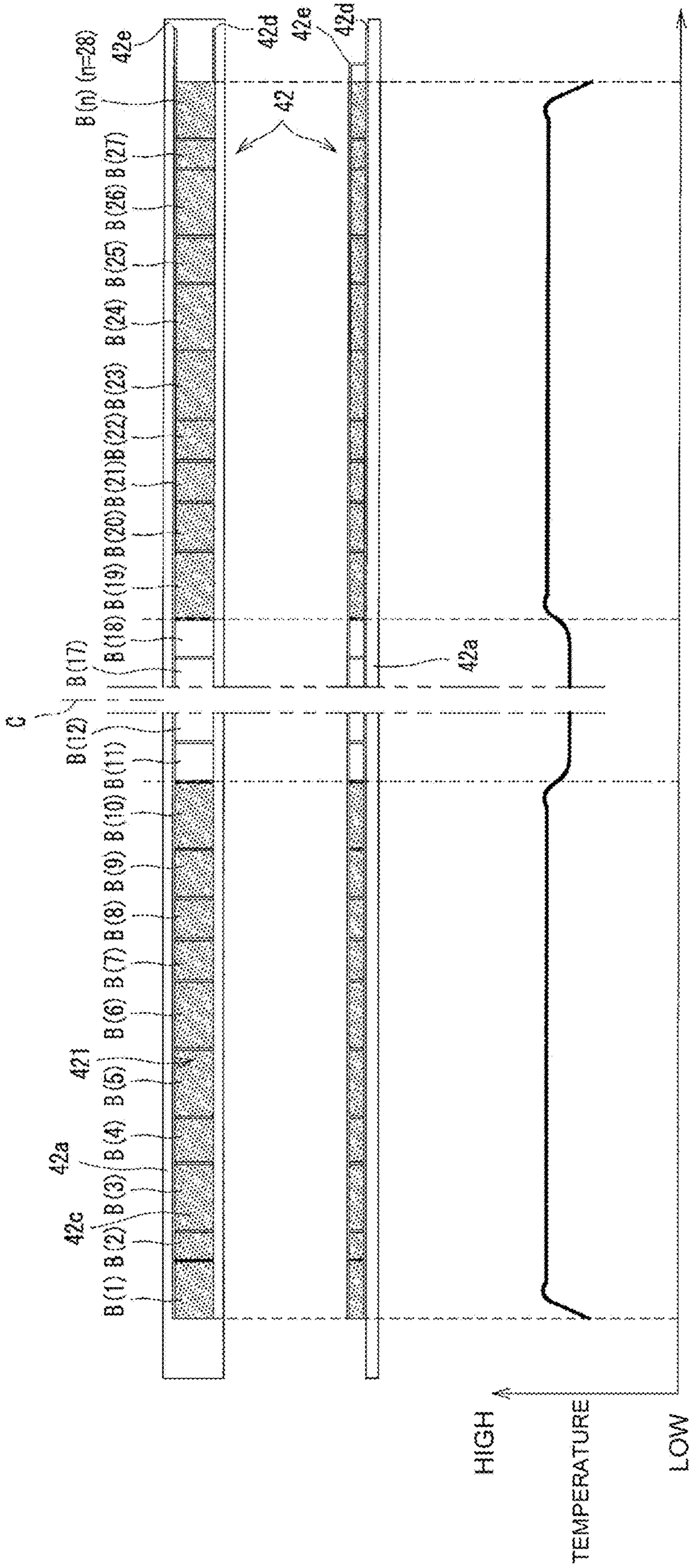
FIG. 6E is a graph of temperature distribution when the heating member illustrated in FIG. 6D generates heat.

FIG. 6D includes a plan view (top) and a side view (bottom) illustrating an example (a fifth mode) in which the Curie temperature of each of second heat generation blocks [B(1) to B(10)], [B(19) to B(n) (n=28)] is set to be higher than the Curie temperature of each of first heat generation blocks B(11) to B(18) in the heating member 42 illustrated in FIG. 6C. FIG. 6E is a graph of temperature distribution when the heating member illustrated in FIG. 6D generates heat.

The heating member 42 illustrated in FIG. 6D includes the first heat generation blocks B(11) to B(18) and the second heat generation blocks [B(1) to B(10)], [B(19) to B(28)] other than the first heat generation blocks B(11) to B(18). The first heat generation blocks B(11) to B(18) correspond to the area through which the recording medium P in the minimum size [the postcard vertical size S(1) in this example] having the shortest length in the width direction of the plural types of the recording media P in the standard sizes S(1) to S(m) (m=6) passes. Here, the first heat generation blocks B(11) to B(18) corresponding to the area through which the recording medium P passes are the heat generation blocks through which a half or more of the recording medium P in the minimum size [S(1)] passes.

By the way, in the heating member 42, when the end (both ends in this example) of the recording medium P in the width direction W passes with the center reference C in the width direction W, a large temperature difference occurs between the first heat generation blocks B(11) to B(18) and the second heat generation blocks [B(1) to B(10)], [B(19) to B(28)]. When the temperature of each of the second heat generation blocks [B(1) to B(10)], [B(19) to B(28)] approaches the vicinity of the Curie temperature, the electric power is significantly reduced due to the increase in the resistance value. Due to this influence, the temperatures of the first heat generation blocks B(11) to B(18) on the inner side, which are adjacent to the second heat generation blocks [B(1) to B(10)], [B(19) to B(28)], are also reduced, and thus it becomes difficult to stably maintain the fixing property in the width direction W.

In this regard, the heating member 42 according to the present embodiment (First Embodiment—3) is configured as follows.

In the heating member 42 illustrated in FIG. 4, FIG. 6A, FIG. 6B, and FIG. 6C (FIG. 6C in this example), the Curie temperature (for example, 230° C. to 270° C.) of each of the second heat generation blocks [B(1) to B(10)], [B(19) to B(28)] is higher than the Curie temperature (for example, 220° C.) of each of the first heat generation blocks B(11) to B(18) (see FIG. 6E).

In this way, even when the temperature of each of the second heat generation blocks [B(1) to B(10)], [B(19) to B(28)] is increased to some extent, the increase in the resistance value can be suppressed, and thus the supply of the electric power can be maintained accordingly. Accordingly, it is possible to maintain the temperatures of the first heat generation blocks B(11) to B(18) and thus to stably maintain the fixing property in the width direction W.

By the way, in the heating member 42 illustrated in FIG. 6D, the heat generation temperature of each of the second heat generation blocks [B(1) to B(10)], [B(19) to B(28)] may be increased to be higher than the heat generation temperature of each of the first heat generation blocks B(11) to B(18) by 10° C. to 50° C. The heat generation temperature of each of the second heat generation blocks [B(1) to B(10)], [B(19) to B(28)] may actually be increased to be higher than the heat generation temperature of each of the first heat generation blocks B(11) to B(18) by 30° C. or more. In the case where the temperature difference exceeds 50° C., it is necessary to suppress the temperature in the high-temperature area of the second heat generation blocks [B(1) to B(10)], [B(19) to B(28)] to be low when the recording medium P in the wider size [S(2) to S(m) (m=6)] than the recording medium P in the minimum size [S(1)] passes after passing of the recording medium P in the minimum size [S(1)].

Thus, in the heating member 42 illustrated in FIG. 6D, it is preferred that the Curie temperature of each of the second heat generation blocks [B(1) to B(10)], [B(19) to B(28)] is higher than the Curie temperature of each of the first heat generation blocks B(11) to B(18) by 10° C. or more. More preferably, the temperature difference is 30° C. or more, and an example of an upper limit value of the temperature difference between the second heat generation blocks [B(1) to B(10)], [B(19) to B(28)] and the first heat generation blocks B(11) to B(18) is 50° C.

Accordingly, even when the temperature of each of the second heat generation blocks [B(1) to B(10)], [B(19) to B(28)] is increased to some extent, the increase in the resistance value can further be suppressed, and the supply of the electric power can be maintained accordingly. Thus, it is possible to further maintain the temperatures of the first heat generation blocks B(11) to B(18) and thereby to more stably maintain the fixing property in the width direction W.

Second Embodiment

Second Embodiment—1

In the second embodiment, components that are substantially the same as those in the first embodiment will be denoted by the same reference numerals as those in the first embodiment, and the description thereon will not be made.

Figure 7A:
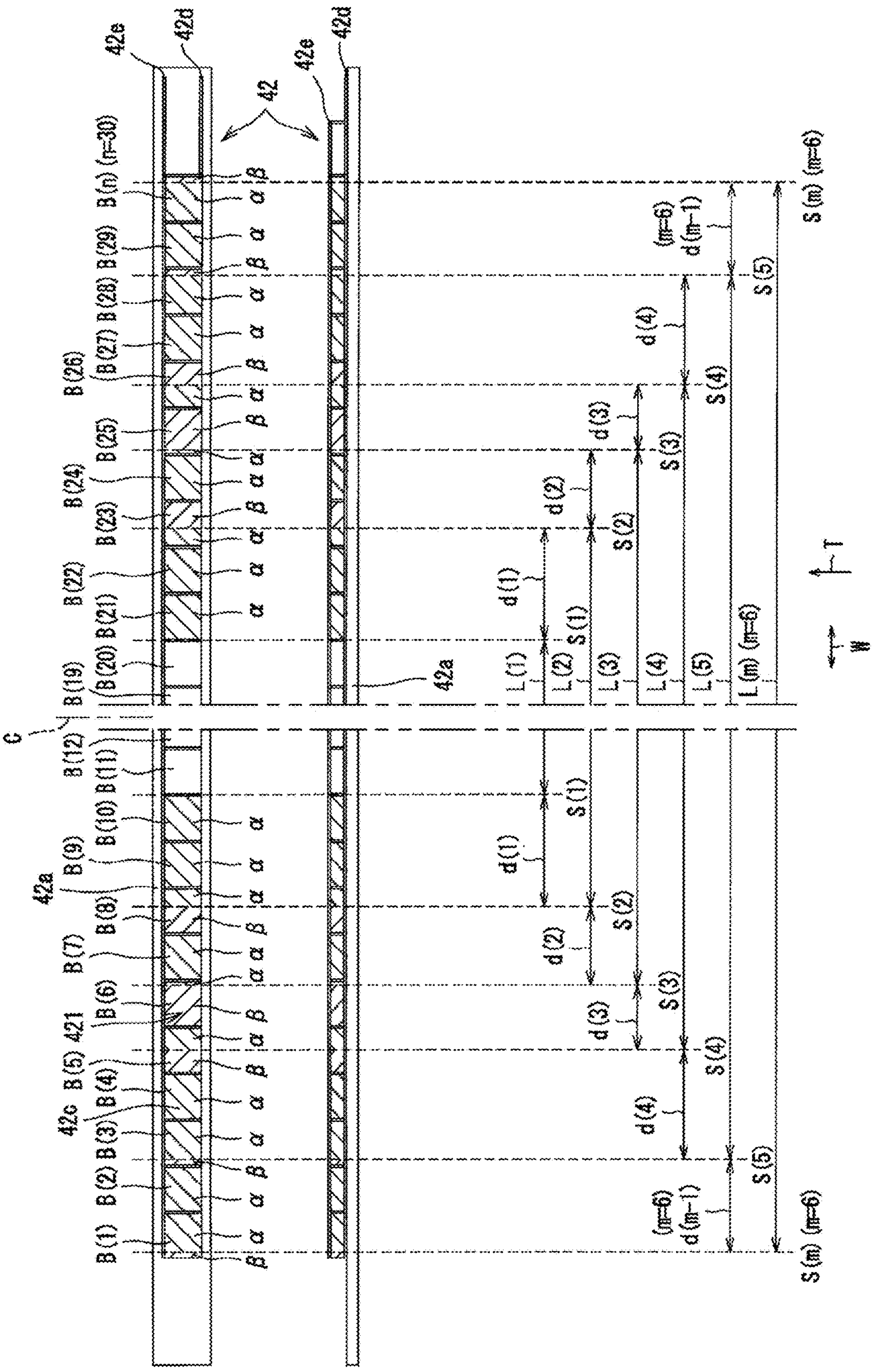
FIG. 7A includes a plan view (top) and a side view (bottom) illustrating a configuration example (the first mode) in which the arrangement pitch of the heat generation blocks is 10 mm in the example illustrated in FIG. 4.

FIG. 7A includes a plan view (top) and a side view (bottom) illustrating a configuration example (the first mode) in which the arrangement pitch PT of the heat generation blocks B(1) to B(n) (n=30) is 10 mm in the example illustrated in FIG. 4.

In the present embodiment, the length in the width direction W of each of the heat generation blocks B(1) to B(n) (n=30) having the minimum difference or shorter is 10 mm or shorter.

In this way, by setting the length in the width direction of each of the heat generation blocks B(1) to B(n) having the minimum difference or shorter to 10 mm or shorter, the image forming apparatus 100 can preferably handle the recording media P in the standard sizes of the centimeter system, which are conveyed using the center reference C.

In the example illustrated in FIG. 7A, in regard to the heat generation blocks B(1) to B(n) (n=30), the arrangement pitch PT (see FIG. 5B) is 10 mm, the length e1 (see FIG. 5B) in the width direction W (the longitudinal direction) is 9.5 mm, the clearance f (see FIG. 5B) between each adjacent pair of the heat generation blocks [B(1), B(2)] to [B(29), B(n)] is 0.5 mm, the distance e2 (see FIG. 5C) in the conveyance direction T (the short direction) is 8 mm, and the thickness h (see FIG. 5A) is 1 mm. Accordingly, the fixing device 4 has the heat generation area of about 300 mm in the width direction W (the longitudinal direction), and thus can handle the recording media P up to the A4 horizontal size/the A3 vertical size S(m) at a maximum.

In the example illustrated in FIG. 7A, the length e1 in the width direction W of each of the heat generation blocks B(1) to B(n) is the minimum difference [d(3)=(L(4)−L(3))/2=14 mm] or shorter (9.5 mm in this example) (the clearance f=0.5 mm). In this way, at least one [B(2), B(4), B(7), B(9) to B(10), B(21) to B(22), B(24), B(27), B(29) in this example] of the heat generation blocks B(1) to B(n) does not include the non-passing area β by the recording medium P and can only include the passing area α.

As illustrated in FIG. 7A, at least one [B(2), B(4), B(7), B(9) to B(10), B(21) to B(22), B(24), B(27), B(29) in this example] of the plural heat generation blocks B(1) to B(n) (n=30) is located between the ends of the recording media P, P in the adjacent standard sizes [S(m−1), S(m)], [S(4), S(5)], [S(2), S(3)], [S(1), S(2)]. In this way, it is possible to reduce the number of the heat generation blocks [B(2), B(4), B(7), B(9) to B(10), B(29) to B(27), B(24), B(22) to B(21) in this example], each of which is passed by the end of respective one of the recording media P to P in the standard sizes [S(1) to S(m)] and thus has the ununiform temperature.

In detail, the heating member 42 is not in contact with the portion between each adjacent pair of the heat generation blocks [B(1), B(2)], to [B(29), B(30)]. The heat generation blocks B(1) to B(30) are connected in parallel in the equivalent circuit between the first conductive wire **42*d* and the second conductive wire 42*e***.

As illustrated in FIG. 7A, when the recording medium P in the standard size of the centimeter system is conveyed with the center in the width direction W being the reference (the center reference C), the length in the width direction W of each of the heat generation blocks B(1) to B(30) having the minimum difference or shorter is set to 14 mm or shorter (9.5 mm in this example, the clearance f=0.5 mm) due to the fact that the minimum difference is set to 14 mm. Thus, the image forming apparatus 100 can favorably handle the recording media P in the standard sizes [S(1), S(2)] to

[S(m−1), S(m) (m=6)] of the centimeter system, each of which is conveyed using the center reference C.

Second Embodiment—2

Figure 7B:
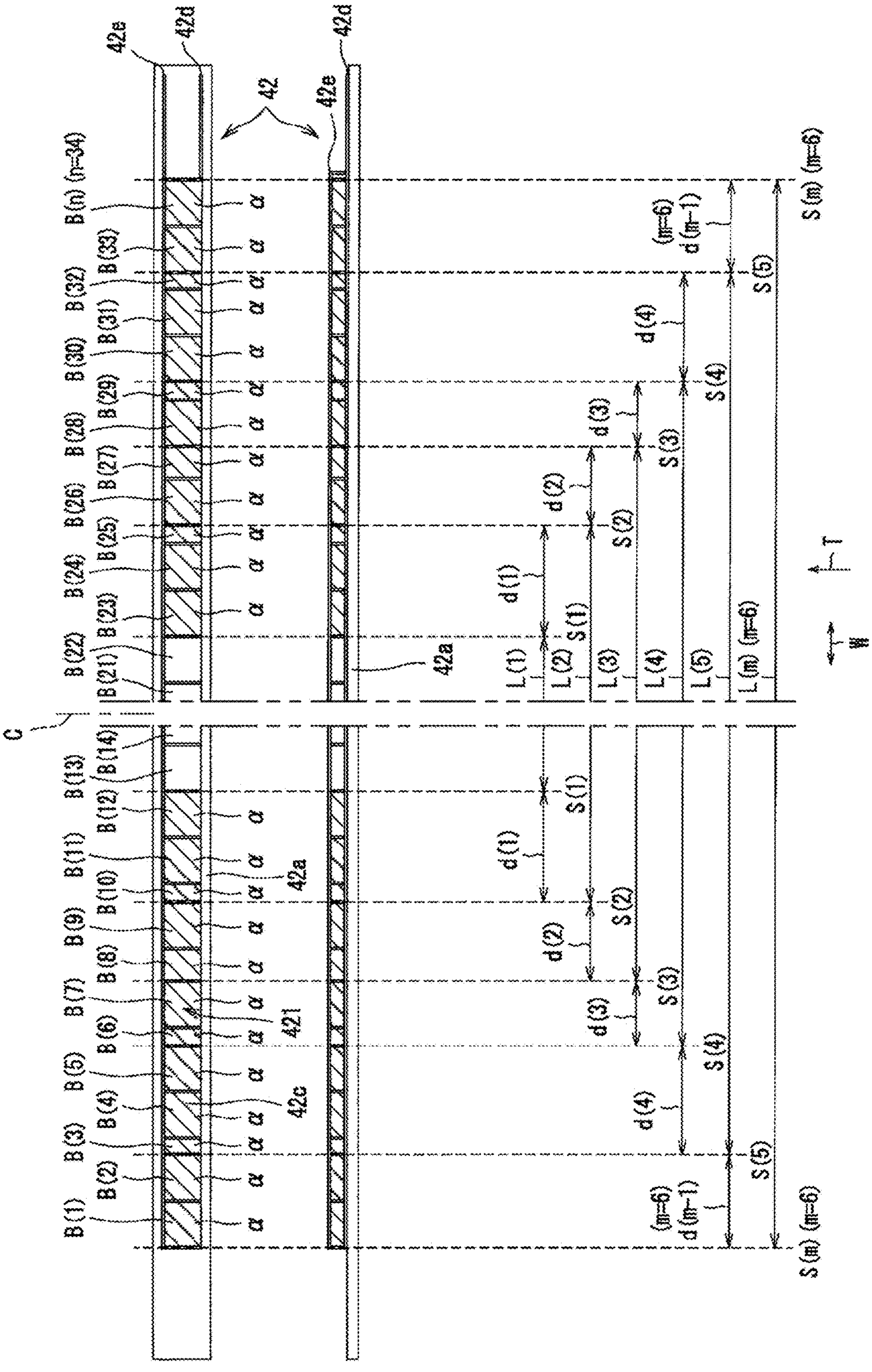
FIG. 7B includes a plan view (top) and a side view (bottom) illustrating another example (the second mode) of the heat generation block illustrated in FIG. 7A.

FIG. 7B includes a plan view (top) and a side view (bottom) illustrating another example (the second mode) of the heat generation blocks B(1) to B(n) (n=34) illustrated in FIG. 7A.

In the configuration illustrated in FIG. 7A, a configuration illustrated in FIG. 7B is an example in which the non-passing area β is not included in each of the heat generation blocks B(1) to B(n) (n=34) in the heating member 42. Accordingly, the end positions in the width direction W of each of the recording media P in the standard sizes S(1) to S(m) (m=6) match boundary positions between two respective pair of the heat generation blocks B(1) to B(34) or the end positions of the heat generation blocks B(1), B(34) at both ends.

The constant length in the width direction W of the heat generation block between each pair of the recording media P, P in the adjacent standard sizes [S(1), S(2)] to [S(m−1), S(m)] is set to be as long as possible within the minimum difference [d(3)] or shorter (9.5 mm or shorter in this example). In addition, the number of the heat generation blocks having the constant (maximum) length (9.5 mm in this example) is set to be the largest in each of the differences d(1) to d(m−1).

In the configuration illustrated in FIG. 7B, the ends in the width direction W of each of the recording media P in the standard sizes S(1) to S(m) (m=6) match joints of the respective two pairs of the heat generation blocks B(1) to B(34) or the ends of the heat generation blocks B(1), B(34) at both ends.

In this way, each of the heat generation blocks B(1) to B(34) does not include the non-passing area β by the recording medium P but only includes the passing area α, and the durability of the heating member 42 can be improved accordingly.

Second Embodiment—3

Figure 7C:
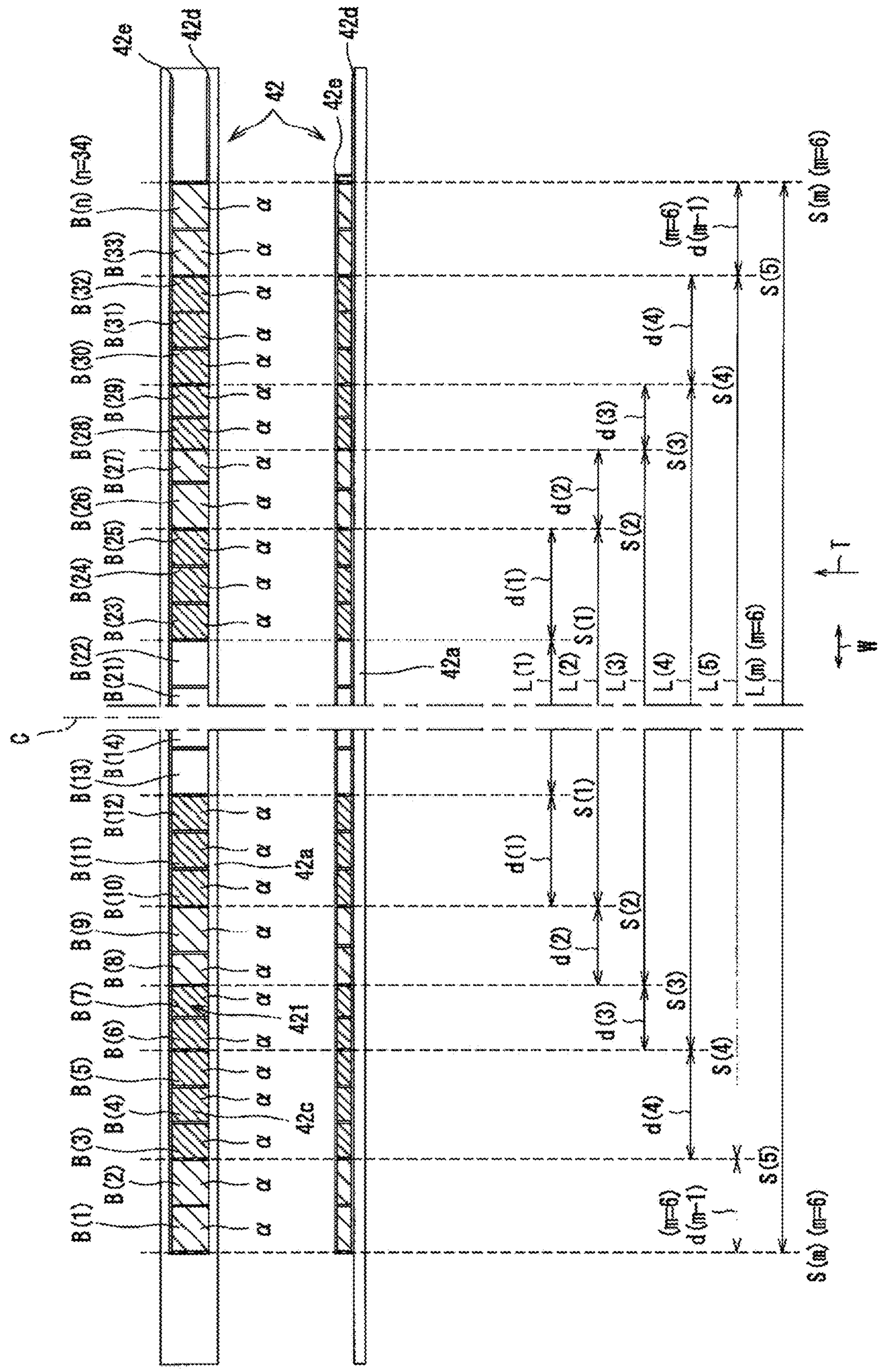
FIG. 7C includes a plan view (top) and a side view (bottom) illustrating an example (the third mode) in which the length in the width direction of the heat generation block having the minimum difference or shorter is 5 mm or longer in the heating member illustrated in FIG. 7B.

FIG. 7C includes a plan view (top) and a side view (bottom) illustrating an example (the third mode) in which the length in the width direction of each of the heat generation blocks B(1) to B(n) (n=34) having the minimum difference or shorter is 5 mm or longer in the heating member 42 illustrated in FIG. 7B.

In the heating member 42 illustrated in FIG. 7C, the length in the width direction W of each of the heat generation blocks B(1) to B(34) having the minimum difference or shorter is 5 mm or longer. In this example, in the heating member 42 illustrated in FIG. 7B, the lengths in the width direction W of the heat generation blocks [B(3), B(4), B(5)], [B(32), B(31), B(30)], [B(6), B(7)], [B(29), B(28)], [B(10), B(11), B(12)], and [B(25), B(24), B(23)], which include the heat generation blocks having the length in the width direction W of 5 mm or shorter, in the differences d(4), d(3), d(1) between the recording media P, P are equalized.

In this way, each of the heat generation blocks B(1) to B(n) can be assembled easily, thereby improving the assembly workability.

Second Embodiment—4

Figure 7D:
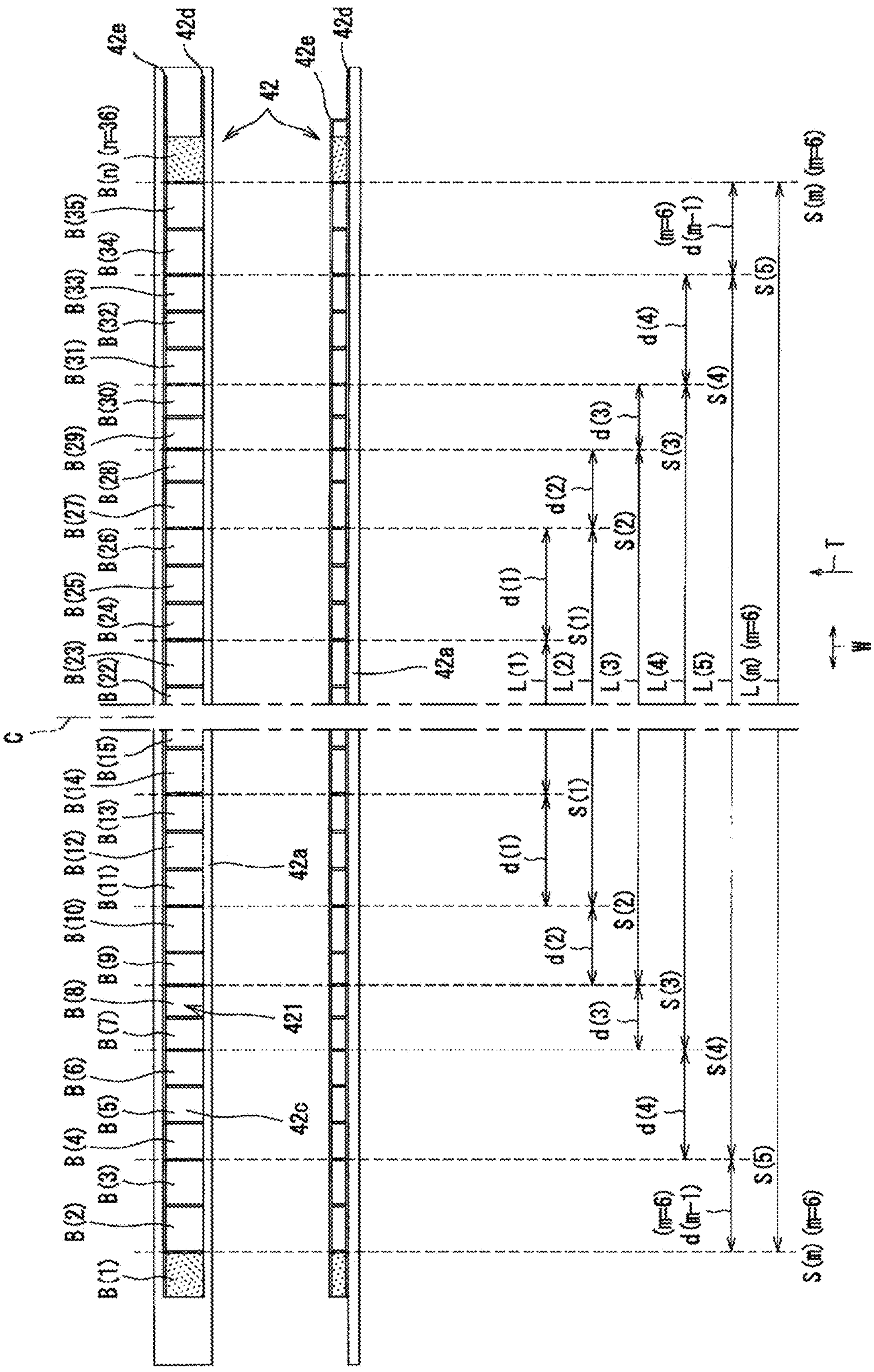
FIG. 7D includes a plan view (top) and a side view (bottom) illustrating an example (the fourth mode) in which the heat generation block is provided at both of the ends of the recording medium in the width direction in the heating member illustrated in FIG. 7C.

FIG. 7D includes a plan view (top) and a side view (bottom) illustrating an example (the fourth mode) in which the heat generation blocks B(1), B(n) (n=36) are provided at both of the ends of the recording media P in the width direction W in the heating member 42 illustrated in FIG. 7C.

In the heating member 42 illustrated in FIG. 7A, FIG. 7B, and FIG. 7C (FIG. 7C in this example), one, two, or more (one on each side in this example) of the heat generation blocks B(1), B(n) exist on the outer side of the heat generation blocks B(2), B(n−1) (n=36) corresponding to the end (both ends in this example) in the width direction W of the recording medium P in the maximum size [S(m)] of the plural types of the standard sizes S(1) to S(m) (m=6).

In this way, it is possible to avoid the reduction in the temperature at the end (both ends) in the width direction W of the recording medium P due to the heat dissipation from the heat generation blocks B(1), B(n) located at the end (both ends in this example) in the width direction W to the fixing member (the fixing belt 41). Accordingly, it is possible to effectively prevent the occurrence of the fixing failure at the end (both ends) in the width direction W of the recording medium P and thus to ensure the fixing property.

Second Embodiment—5

Figure 7E:
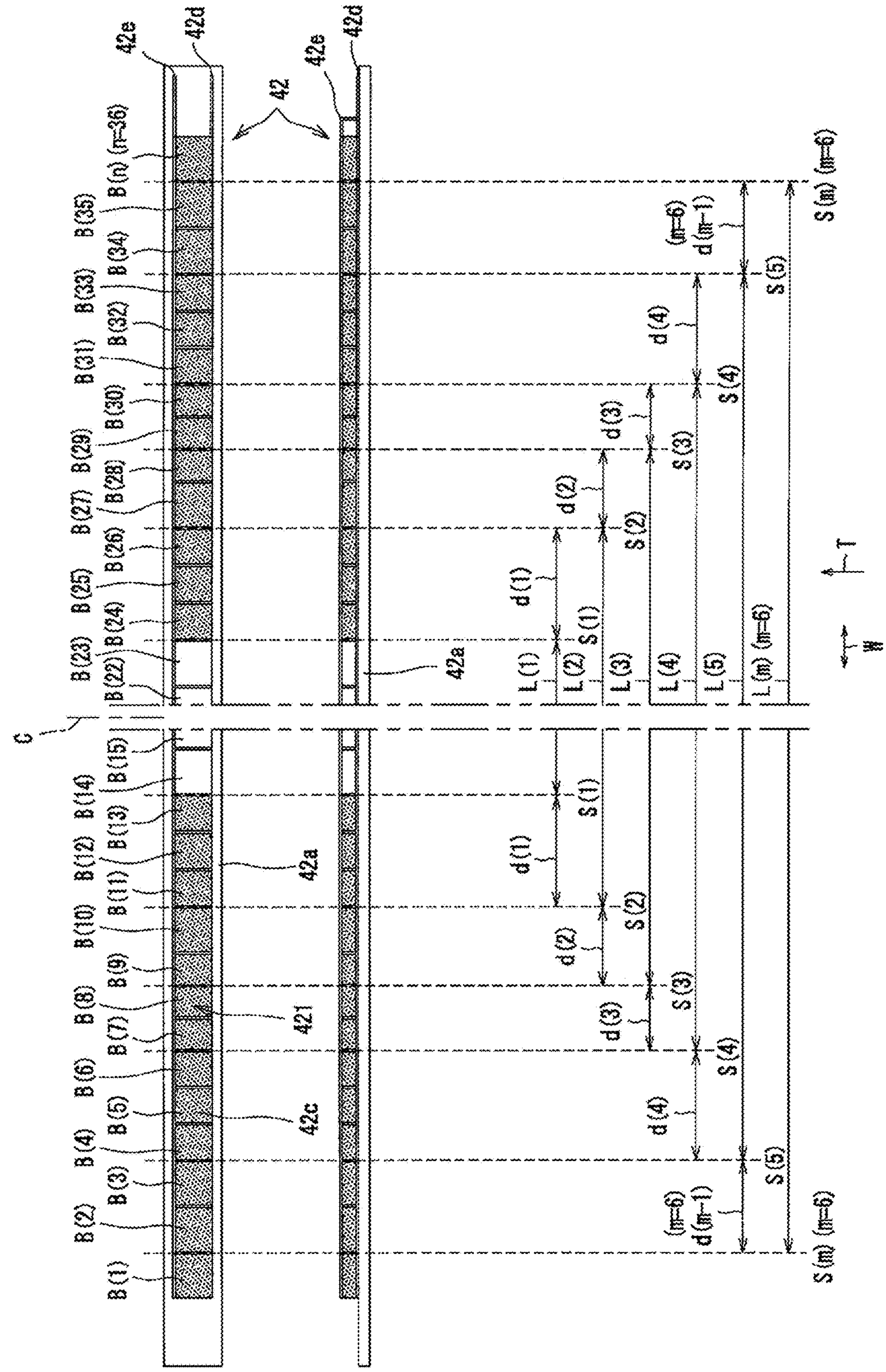
FIG. 7E includes a plan view (top) and a side view (bottom) illustrating an example (the fifth mode) in which the Curie temperature of the second heat generation block is higher than the Curie temperature of the first heat generation block in the heating member illustrated in FIG. 7D.

FIG. 7E includes a plan view (top) and a side view (bottom) illustrating an example (the fifth mode) in which the Curie temperature of each of the second heat generation blocks [B(1) to B(13)], [B(24) to B(n) (n=36)] is set to be higher than the Curie temperature of each of the first heat generation blocks [B(14) to B(23)] in the heating member illustrated in FIG. 7D.

In the heating member 42 illustrated in FIG. 7A to FIG. 7D (FIG. 7D in this example), the Curie temperature (for example, 230° C. to 270° C.) of each of the second heat generation blocks [B(1) to B(13)], [B(24) to B(36)] is higher than the Curie temperature (for example, 220° C.) of each of the first heat generation blocks B(14) to B(23).

In this way, even when the temperature of each of the second heat generation blocks [B(1) to B(13)], [B(24) to B(36)] is increased to some extent, the increase in the resistance value can be suppressed, and thus the supply of the electric power can be maintained accordingly. Accordingly, it is possible to maintain the temperatures of the first heat generation blocks [B(14) to B(23)] and thus to stably maintain the fixing property in the width direction W.

Third Embodiment

Third Embodiment—1

In a third embodiment, components that are substantially the same as those in the first embodiment and the second embodiment will be denoted by the same reference numerals as those in the first embodiment and the second embodiment, and the description thereon will not be made.

FIG. 8 is a table illustrating the minimum difference [d(m−1)=(L(m)−L(m−1))/2=9 mm] (m=7) when the standard size (11×17 vertical·8.5×11 horizontal size) of the inch system is included in the table illustrated in FIG. 3.

For example, as illustrated in FIG. 8, in regard to the recording media P in the standard sizes [S(1) to S(m) (m=7)] of the centimeter system and the inch system, when the recording medium Pin the 11×17 vertical size or the 8.5×11 horizontal size [L(6)=279 mm] is further conveyed as the standard size of the centimeter system or the inch system with the center in the width direction W as the reference (the center reference C), a minimum difference d(6) is d(6)=(L (7)−L(6))/2=9 mm (see hatching in FIG. 8). Thus, the minimum difference is further desirably 9 mm or shorter.

Figure 9A:
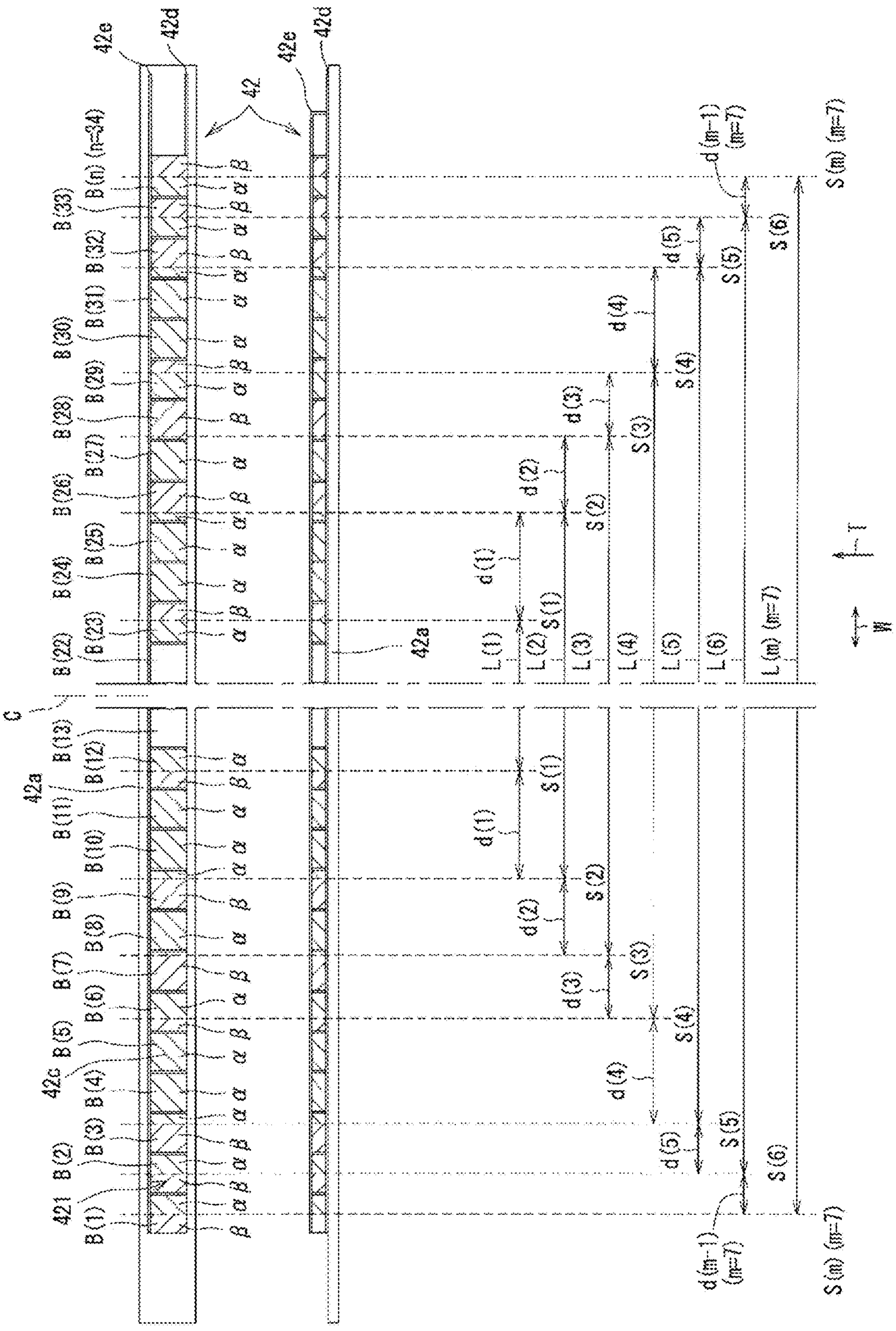
FIG. 9A includes a plan view (top) and a side view (bottom) illustrating a configuration example (the first mode) in which the arrangement pitch of the heat generation blocks is 9 mm when the minimum difference of the length in the width direction between two each of the recording media illustrated in FIG. 8 is 9 mm.

FIG. 9A includes a plan view (top) and a side view (bottom) illustrating a configuration example (the first mode) in which the arrangement pitch PT of the heat generation blocks B(1) to B(n) (n=34 in this example) is 9 mm when the minimum difference of the length [L(1) to L(m) (m=7)] in the width direction W between two each of the recording media P illustrated in FIG. 8 is 9 mm [=d(6) =(L(7)−L(6))/2].

In the present embodiment, the length in the width direction W of each of the heat generation blocks B(1) to B(n) (n=34) having the minimum difference or shorter is 9 mm or shorter.

In this way, by setting the length in the width direction W of each of the heat generation blocks B(1) to B(n) having the minimum difference or shorter to 9 mm or shorter, the image forming apparatus 100 can preferably handle the recording media P in the standard sizes of the centimeter system and the inch system, which are conveyed using the center reference C.

In the example illustrated in FIG. 9A, in regard to the heat generation blocks B(1) to B(n), the arrangement pitch PT (see FIG. 5B) is 9 mm, the length e1 (see FIG. 5B) in the width direction W (the longitudinal direction) is 8.5 mm, the clearance f (see FIG. 5B) between each adjacent pair of the heat generation blocks [B(1), B(2)] to [B(33), B(n)] (n=34) is 0.5 mm, the distance e2 (see FIG. 5C) in the conveyance direction T (the short direction) is 8 mm, and the thickness h (see FIG. 5A) is 1 mm. Accordingly, the fixing device 4 has the heat generation area of about 306 mm in the width direction W (the longitudinal direction), and thus can handle the recording media P up to the A4 horizontal size/the A3 vertical size S(m) (m=7) at a maximum.

In detail, the heating member 42 is not in contact with the portion between each adjacent pair of the heat generation blocks [B(1), B(2)], to [B(33), B(34)]. The heat generation blocks B(1) to B(34) are connected in parallel in the equivalent circuit between the first conductive wire 42*d* and the second conductive wire 42*e*.

Third Embodiment—2

Figure 9B:
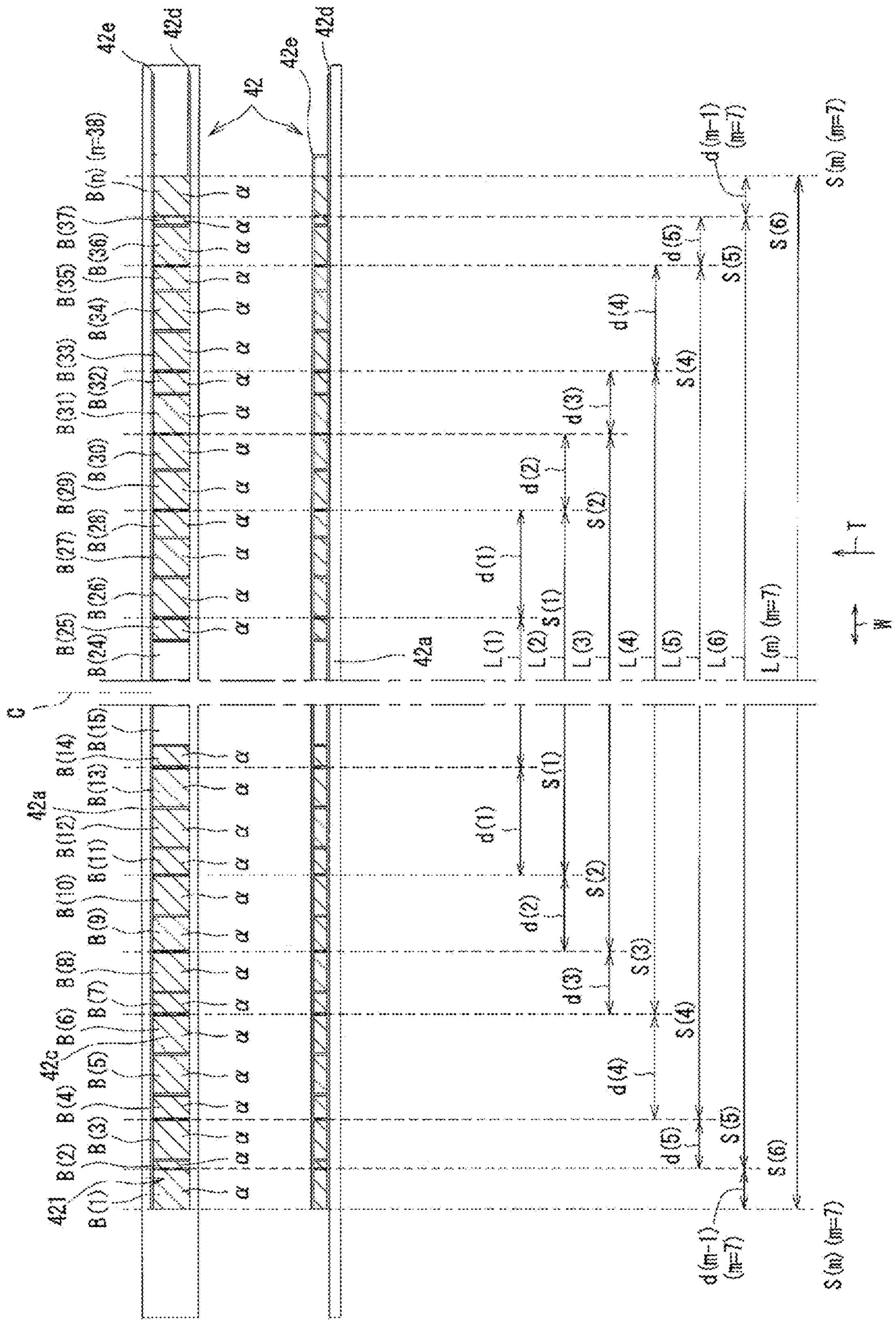
FIG. 9B includes a plan view (top) and a side view (bottom) illustrating another example (the second mode) of the heat generation block illustrated in FIG. 9A.

FIG. 9B includes a plan view (top) and a side view (bottom) illustrating another example (the second mode) of the heat generation blocks B(1) to B(n) (n=38) illustrated in FIG. 9A.

In the configuration illustrated in FIG. 9A, a configuration illustrated in FIG. 9B is an example in which the non-passing area β is not included in each of the heat generation blocks B(1) to B(n) (n=38) in the heating member 42. Accordingly, the end positions in the width direction W of each of the recording media P in the standard sizes S(1) to S(m) (m=7) match the boundary positions between two respective pair of the heat generation blocks B(1) to B(38) or the end positions of the heat generation blocks B(1), B(38) at both ends.

The constant length in the width direction W of the heat generation block between each pair of the recording media P, P in the adjacent standard sizes [S(1), S(2)] to [S(m−1), S(m)] is set to be as long as possible within the minimum difference [d(3)] or shorter (8.5 mm or shorter in this example). In addition, the number of the heat generation blocks having the constant (maximum) length (8.5 mm in this example) is set to be the largest in each of the differences d(1) to d(m−1).

In the configuration illustrated in FIG. 9B, the ends in the width direction W of each of the recording media P in the standard sizes S(1) to S(m) (m=7) match joints of the respective two pairs of the heat generation blocks B(1) to B(38) or the ends of the heat generation blocks B(1), B(38) at both ends.

In this way, each of the heat generation blocks B(1) to B(38) does not include the non-passing area β by the recording medium P but only includes the passing area α, and the durability of the heating member 42 can be improved accordingly.

Third Embodiment—3

Figure 9C:
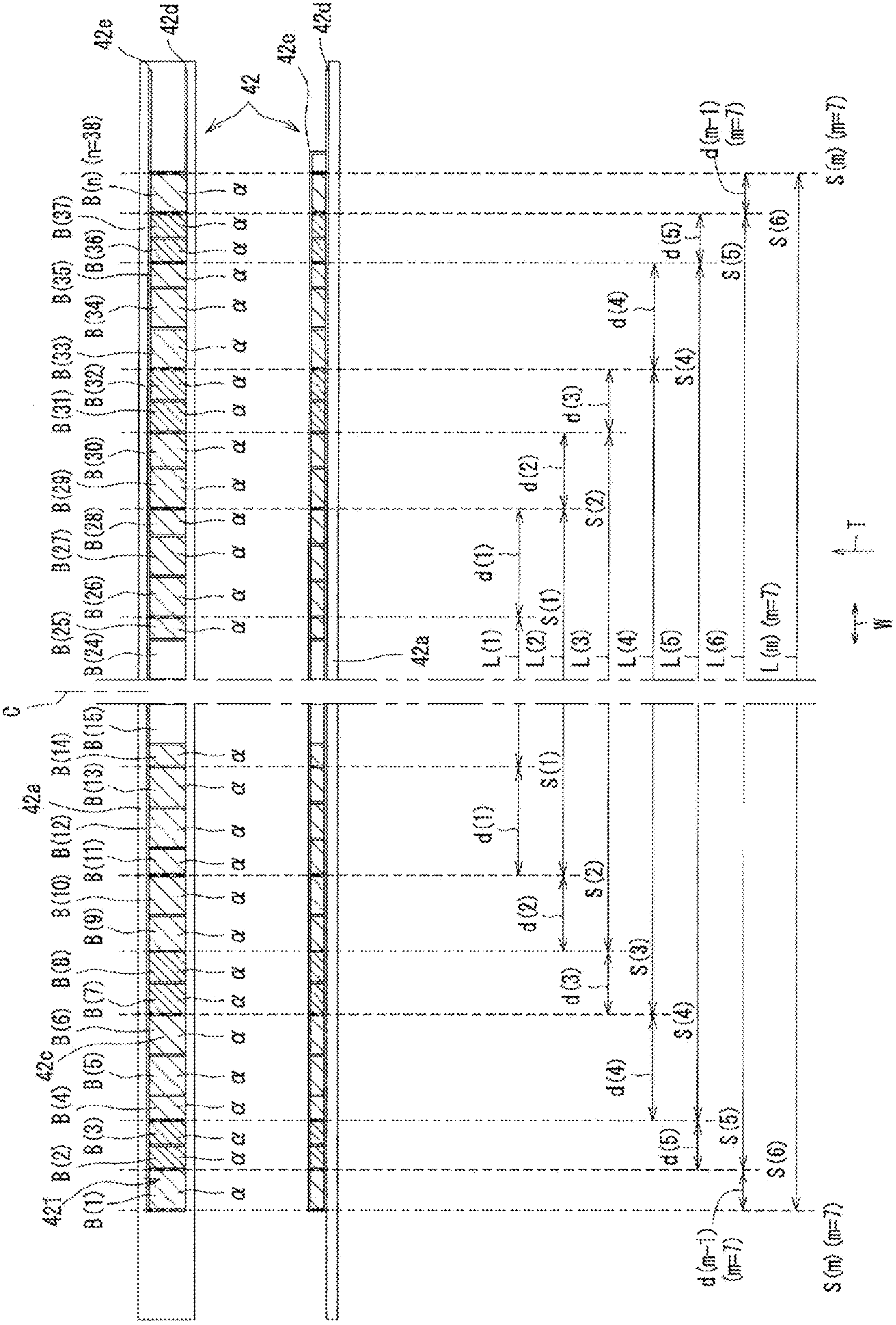
FIG. 9C includes a plan view (top) and a side view (bottom) illustrating an example (the third mode) in which the length in the width direction of each of the heat generation blocks in the difference is 5 mm or longer in the heating member illustrated in FIG. 9B.

FIG. 9C includes a plan view (top) and a side view (bottom) illustrating an example (the third mode) in which the length in the width direction W of each of the heat generation blocks B(1) to B(38) having the minimum difference or shorter among the differences d(1) to d(m−1) (m=7) is 5 mm or longer in the heating member 42 illustrated in FIG. 9B.

In the heating member 42 illustrated in FIG. 9C, the length in the width direction W of each of the heat generation blocks B(1) to B(38) having the minimum difference or shorter is 5 mm or longer. In this example, in the heating member 42 illustrated in FIG. 9B, the lengths in the width direction W of the heat generation blocks [B(2), B(3)], [B(37), B(36)], [B(7), B(8)], and [B(32), B(31)], which include the heat generation blocks having the length in the width direction W of 5 mm or shorter, in the differences d(5), d(3) between the recording media P, P are equalized.

In this way, each of the heat generation blocks B(1) to B(n) can be assembled easily, thereby improving the assembly workability.

Third Embodiment—4

Figure 9D:
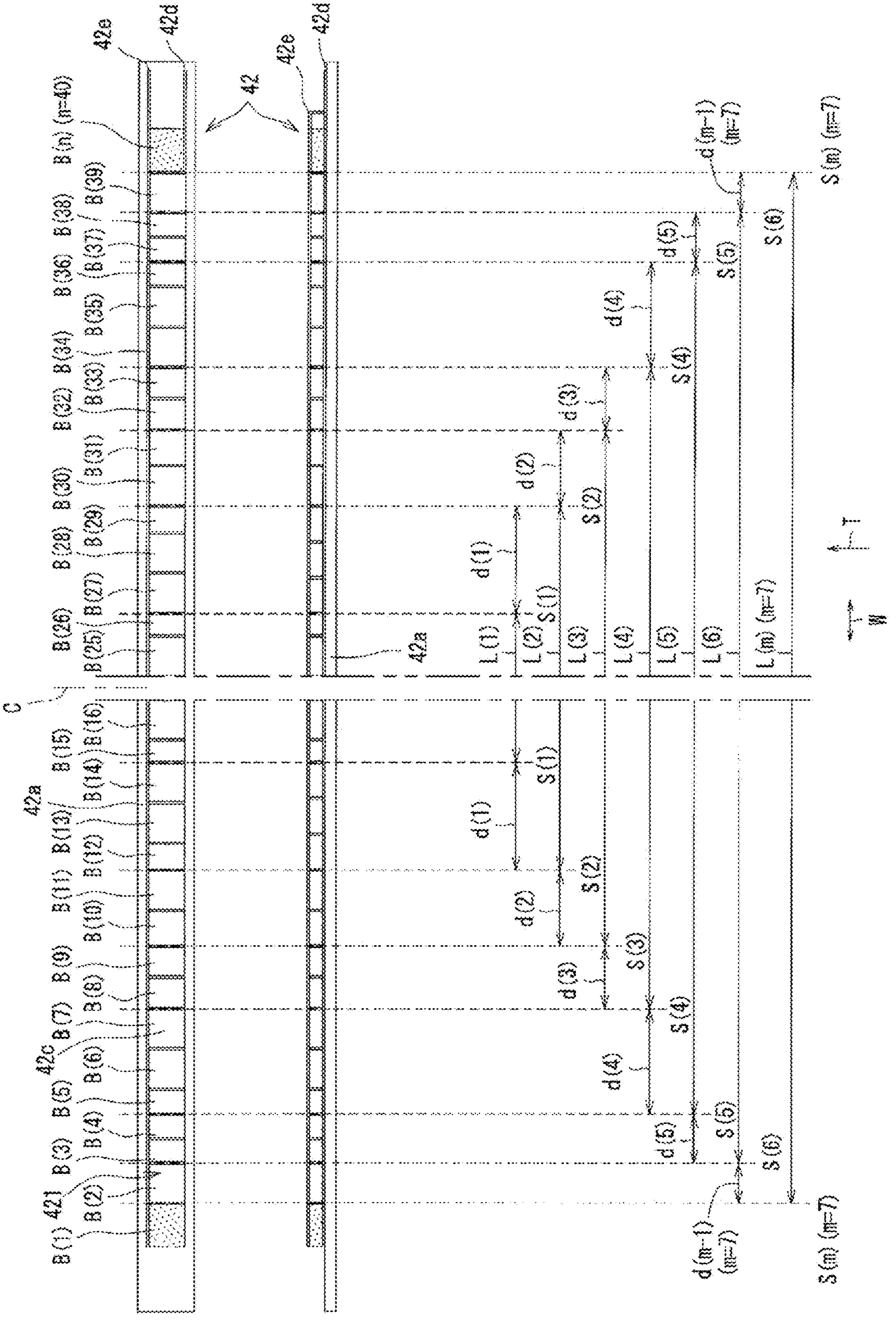
FIG. 9D includes a plan view (top) and a side view (bottom) illustrating an example (the fourth mode) in which the heat generation block is provided at both of the ends of the recording medium in the width direction in the heating member illustrated in FIG. 9C.

FIG. 9D includes a plan view (top) and a side view (bottom) illustrating an example (the fourth mode) in which the heat generation blocks B(1), B(n) (n=40) are provided at both of the ends of the recording media P in the width direction W in the heating member 42 illustrated in FIG. 9C.

In the heating member 42 illustrated in FIG. 9A, FIG. 9B, and FIG. 9C (FIG. 9C in this example), one, two, or more (one on each side in this example) of the heat generation blocks B(1), B(n) exist on the outer side of the heat generation blocks B(2), B(n−1) (n=40) corresponding to the end(both ends in this example) in the width direction W of the recording medium P in the maximum size [S(m)] of the plural types of the standard sizes S(1) to S(m) (m=7).

In this way, it is possible to avoid the reduction in the temperature at the end(both ends) in the width direction W of the recording medium P due to the heat dissipation from the heat generation blocks B(1), B(n) located at the end(both ends in this example) in the width direction W to the fixing member (the fixing belt 41). Accordingly, it is possible to effectively prevent the occurrence of the fixing failure at the end(both ends) in the width direction W of the recording medium P and thus to ensure the fixing property.

Third Embodiment—5

Figure 9E:
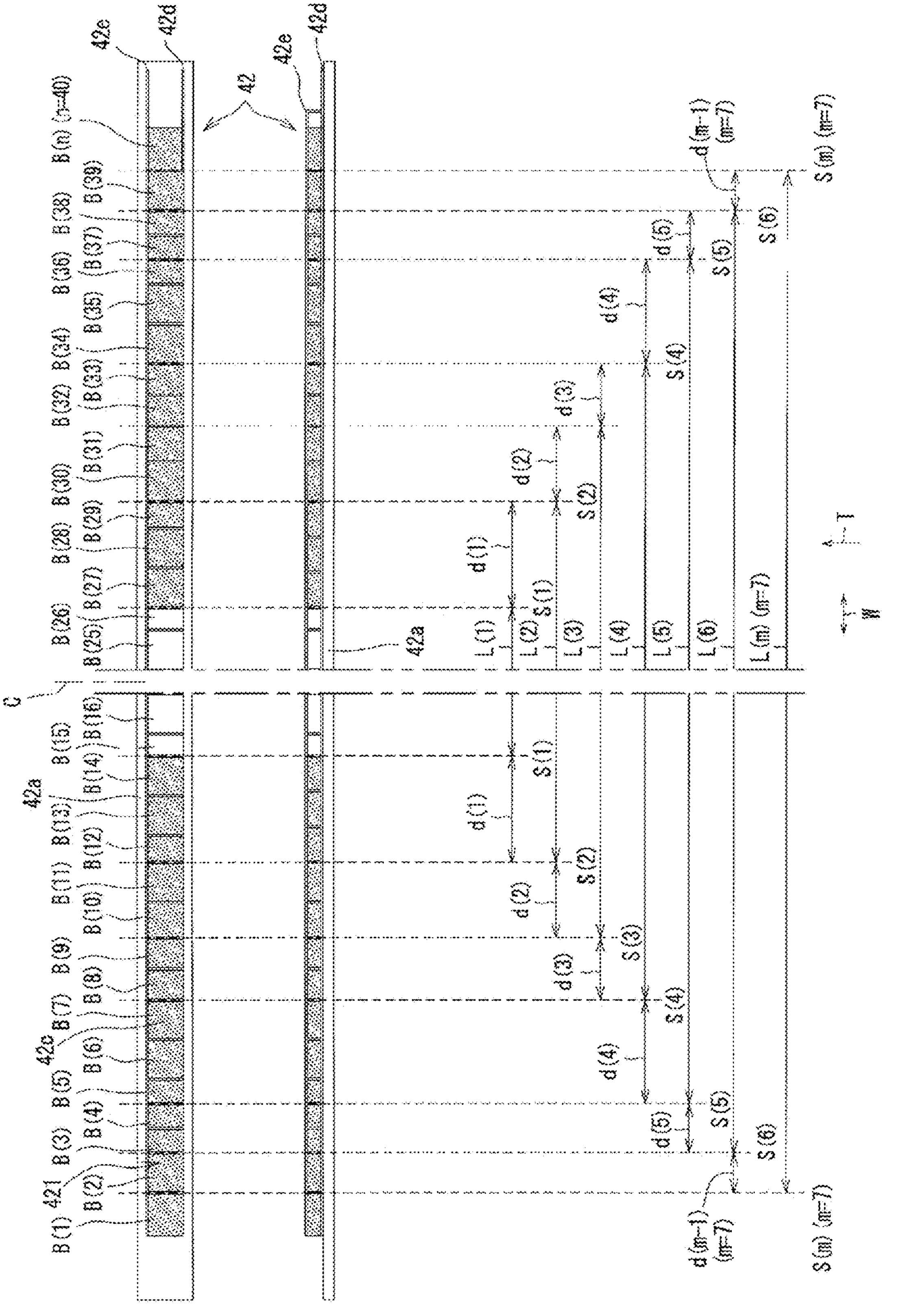
FIG. 9E includes a plan view (top) and a side view (bottom) illustrating an example (the fifth mode) in which the Curie temperature of the second heat generation block is higher than the Curie temperature of the first heat generation block in the heating member illustrated in FIG. 9D.

FIG. 9E includes a plan view (top) and a side view (bottom) illustrating an example (the fifth mode) in which the Curie temperature of each of the second heat generation blocks [B(1) to B(15)], [B(27) to B(40)] is set to be higher than the Curie temperature of each of the first heat generation blocks [B(16) to B(26)] in the heating member 42 illustrated in FIG. 9D.

In the heating member 42 illustrated in FIG. 9A to FIG. 9D (FIG. 9D in this example), the Curie temperature (for example, 230° C. to 270° C.) of each of the second heat generation blocks [B(1) to B(14)], [B(27) to B(40)] is higher than the Curie temperature (for example, 220° C.) of each of the first heat generation blocks B(15) to B(26).

In this way, even when the temperature of each of the second heat generation blocks [B(1) to B(14)], [B(27) to B(40)] is increased to some extent, the increase in the resistance value can be suppressed, and thus the supply of the electric power can be maintained accordingly.

Accordingly, it is possible to maintain the temperatures of the first heat generation blocks [B(15) to B(26)] and thus to stably maintain the fixing property in the width direction W.

Fourth Embodiment

Fourth Embodiment—1

In a fourth embodiment, components that are substantially the same as those in the first embodiment to the third embodiment will be denoted by the same reference numerals as those in the first embodiment to the third embodiment, and the description thereon will not be made.

FIG. 10 is a table illustrating the minimum difference [d(5)=(L(6)−L(5))/2=3 mm] when the standard size (8.5×11 vertical·5.5×8.5 horizontal size, and 5.5×8.5 vertical size) of the inch system is included in the table illustrated in FIG. 8.

For example, as illustrated in FIG. 10, in regard to the recording media P in the standard sizes [S(1) to S(m) (m=9)] of the centimeter system and the inch system, when the recording media P in the 11×17 vertical size or the 8.5×11 horizontal size [L(8)=279 mm], the 8.5×11 vertical size or the 5.5×8.5 horizontal size [L(6)=216 mm], and the 5.5×8.5 vertical size [L(2)=140 mm] are further conveyed as the standard sizes of the centimeter system and the inch system with the center in the width direction W as the reference (the center reference C), the minimum difference d(5) is d(5)=(L(6)−L(5))/2=3 mm (see hatching in FIG. 10). Thus, the minimum difference is further desirably 3 mm or shorter.

Figure 11A:
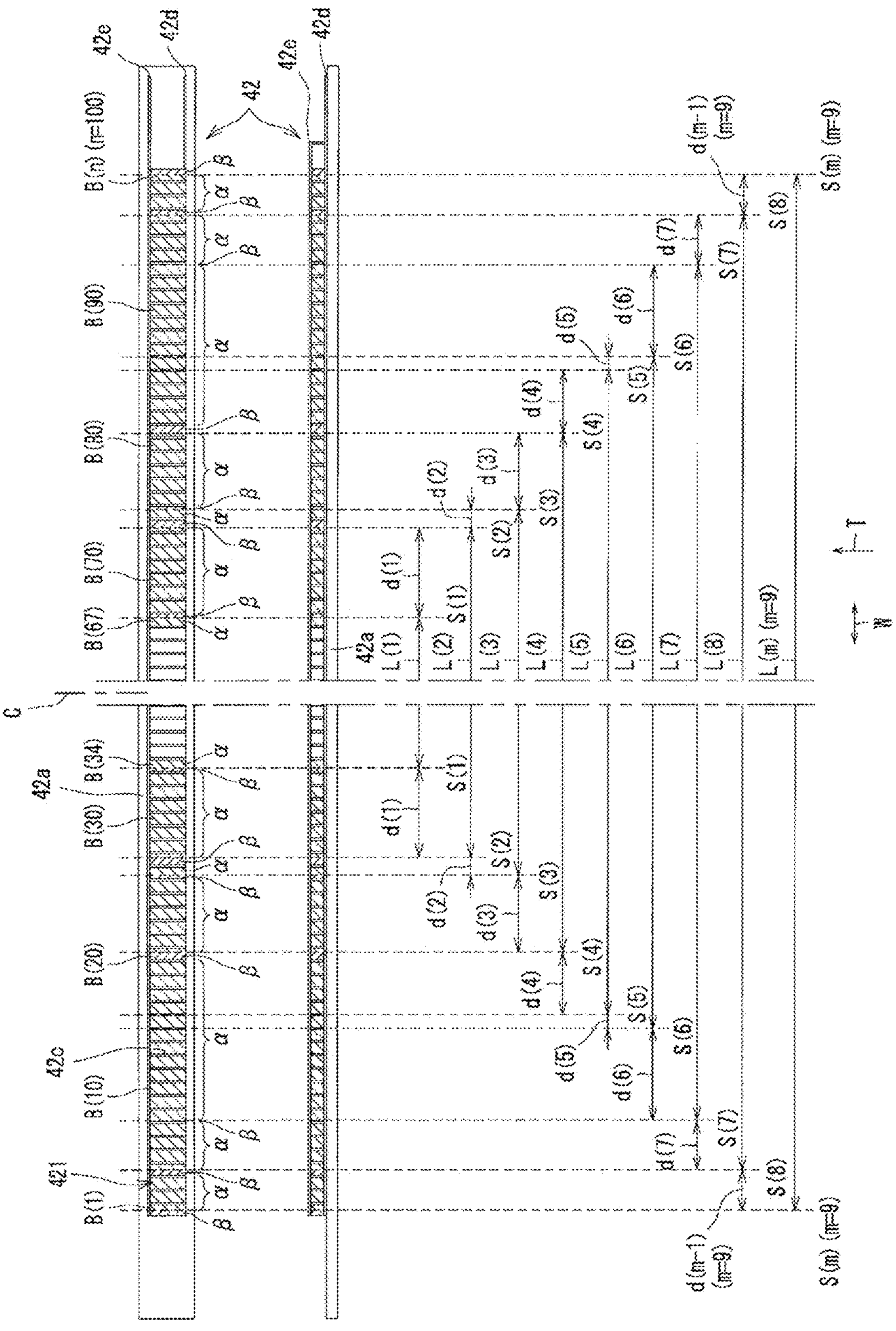
FIG. 11A includes a plan view (top) and a side view (bottom) illustrating a configuration example (the first mode) in which the arrangement pitch of the heat generation blocks is 3 mm when the minimum difference of the length in the width direction between two each of the recording media illustrated in FIG. 10 is 3 mm.

FIG. 11A includes a plan view (top) and a side view (bottom) illustrating a configuration example (the first mode) in which the arrangement pitch PT of the heat generation blocks B(1) to B(n) (n=100 in this example) is 3 mm when the minimum difference of the length [L(1) to L(m) (m=9)] in the width direction W between two each of the recording media P illustrated in FIG. 10 is 3 mm [=d(5)=(L(6)−L(5))/2].

In the present embodiment, the length in the width direction W of each of the heat generation blocks B(1) to B(n) (n=100) having the minimum difference or shorter is 3 mm or shorter.

In this way, by setting the length in the width direction W of each of the heat generation blocks B(1) to B(n) having the minimum difference or shorter to 3 mm or shorter, the image forming apparatus 100 can preferably handle the recording media P in the standard sizes of the centimeter system and the inch system, which are conveyed using the center reference C.

In the example illustrated in FIG. 11A, in regard to the heat generation blocks B(1) to B(n), the arrangement pitch PT (see FIG. 5B) is 3 mm, the length e1 (see FIG. 5B) in the width direction W (the longitudinal direction) is 2.5 mm, the clearance f (see FIG. 5B) between each adjacent pair of the heat generation blocks [B(1), B(2)] to [B(99), B(n)] (n=100) is 0.5 mm, the distance e2 (see FIG. 5C) in the conveyance direction T (the short direction) is 8 mm, and the thickness h (see FIG. 5A) is 1 mm. Accordingly, the fixing device 4 has the heat generation area of about 300 mm in the width direction W (the longitudinal direction), and thus can handle the recording media P up to the A4 horizontal size/the A3 vertical size S(m) (m=9) at a maximum.

In detail, the heating member 42 is not in contact with the portion between each adjacent pair of the heat generation blocks [B(1), B(2)], to [B(99), B(100)]. The heat generation blocks B(1) to B(100) are connected in parallel in the equivalent circuit between the first conductive wire 42*d* and the second conductive wire 42*e*.

Fourth Embodiment—2

Figure 11B:
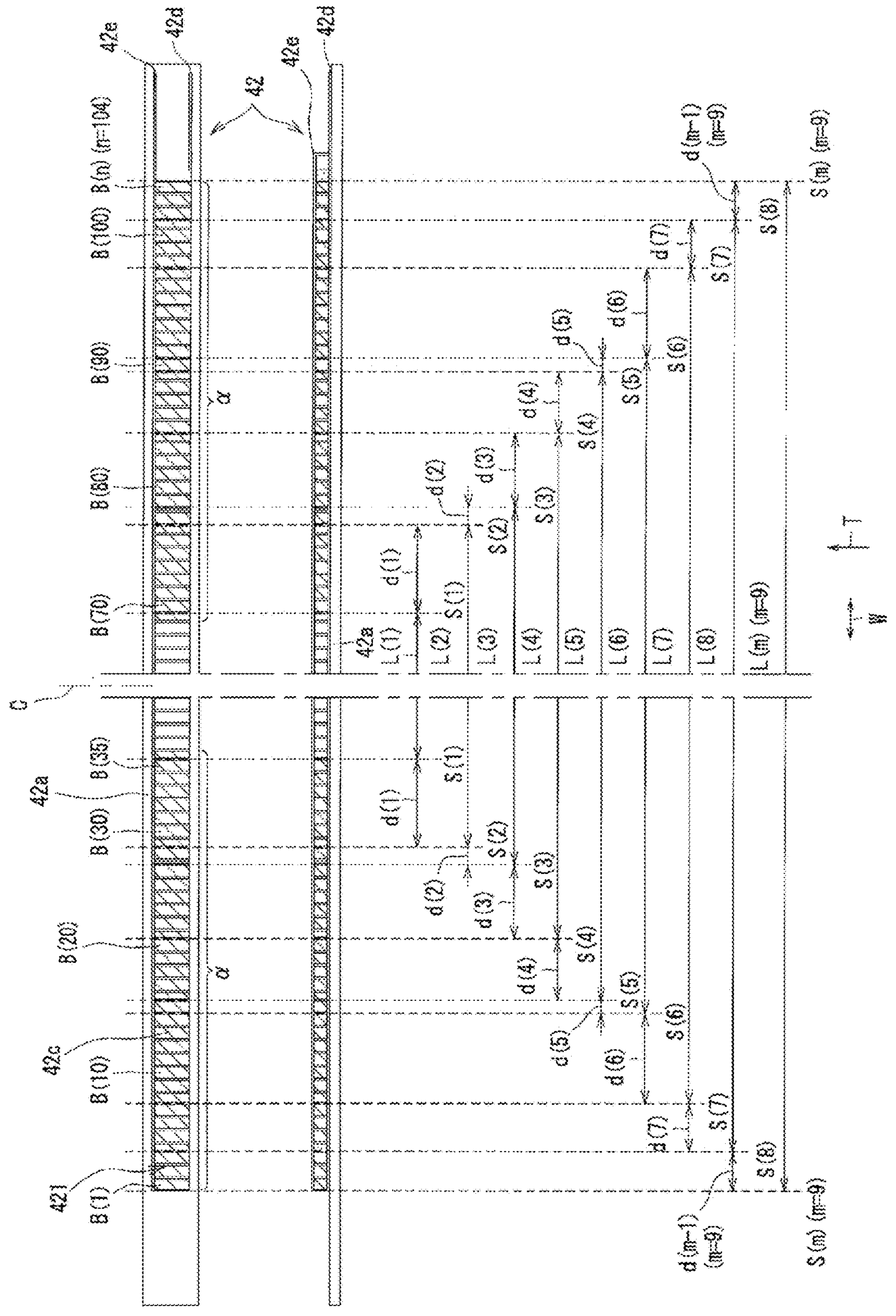
FIG. 11B includes a plan view (top) and a side view (bottom) illustrating another example (the second mode) of the heat generation block illustrated in FIG. 11A.

FIG. 11B includes a plan view (top) and a side view (bottom) illustrating another example (the second mode) of the heat generation blocks B(1) to B(n) (n=104) illustrated in FIG. 11A.

In the configuration illustrated in FIG. 11A, a configuration illustrated in FIG. 11B is an example in which the non-passing area β is not included in each of the heat generation blocks B(1) to B(n) (n=104) in the heating member 42. Accordingly, the end positions in the width direction W of each of the recording media P in the standard sizes S(1) to S(m) (m=9) match the boundary positions between two respective pair of the heat generation blocks B(1) to B(104) or the end positions of the heat generation blocks B(1), B(104) at both ends.

The constant length in the width direction W of the heat generation block between each pair of the recording media P, P in the adjacent standard sizes [S(1), S(2)] to [S(m−1), S(m)] is set to be as long as possible within the minimum difference [d(5)] or shorter (2.5 mm or shorter in this example). In addition, the number of the heat generation blocks having the constant (maximum) length (2.5 mm in this example) is set to be the largest in each of the differences d(1) to d(m−1).

In the configuration illustrated in FIG. 11B, the ends in the width direction W of each of the recording media P in the standard sizes S(1) to S(m) (m=9) match joints of the respective two pairs of the heat generation blocks B(1) to B(104) or the ends of the heat generation blocks B(1), B(104) at both ends.

In this way, each of the heat generation blocks B(1) to B(104) does not include the non-passing area β by the recording medium P but only includes the passing area α, and the durability of the heating member 42 can be improved accordingly.

Fourth Embodiment—3

Figure 11C:
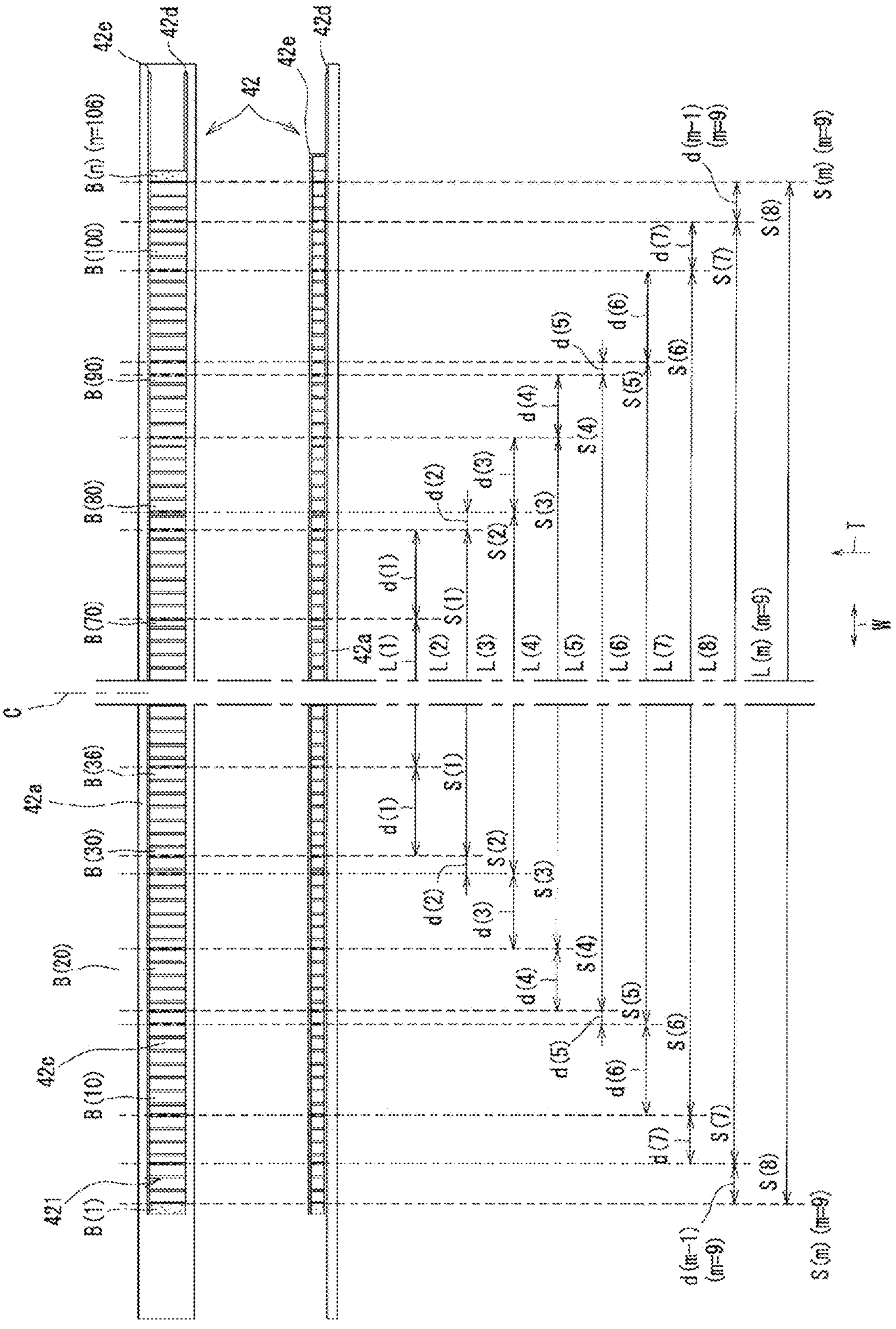
FIG. 11C includes a plan view (top) and a side view (bottom) illustrating an example (the third mode) in which the heat generation block is provided at both of the ends of the recording medium in the width direction in the heating member illustrated in FIG. 11B.
Figure 11D:
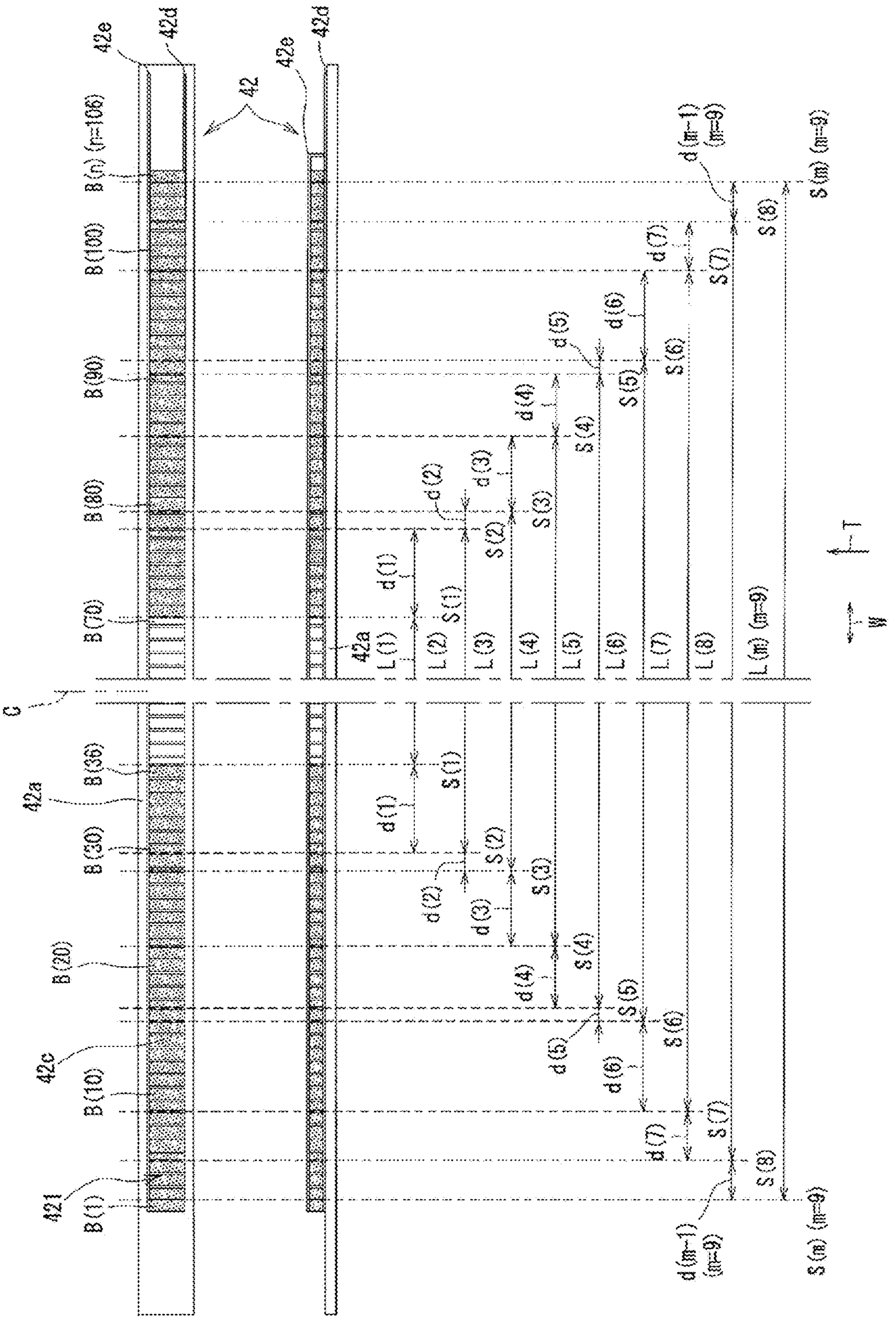
FIG. 11D includes a plan view (top) and a side view (bottom) illustrating an example (the fourth mode) in which the Curie temperature of the second heat generation block is higher than the Curie temperature of the first heat generation block in the heating member illustrated in FIG. 11C.

FIG. 11C includes a plan view (top) and a side view (bottom) illustrating an example (the third mode) in which the heat generation blocks B(1), B(n) (n=106) are provided at both of the ends of the recording media P in the width direction W in the heating member 42 illustrated in FIG. 11D.

In the heating member 42 illustrated in FIG. 11A and FIG. 11B (FIG. 11B in this example), one, two, or more (one on each side in this example) of the heat generation blocks B(1), B(n) exist on the outer side of the heat generation blocks B(2), B(n−1) (n=106) corresponding to the end (both ends in this example) in the width direction W of the recording medium P in the maximum size [S(m)] of the plural types of the standard sizes S(1) to S(m) (m=9).

In this way, it is possible to avoid the reduction in the temperature at the end(both ends) in the width direction W of the recording medium P due to the heat dissipation from the heat generation blocks B(1), B(n) located at the end(both ends in this example) in the width direction W to the fixing member (the fixing belt 41). Accordingly, it is possible to effectively prevent the occurrence of the fixing failure at the end(both ends) in the width direction W of the recording medium P and thus to ensure the fixing property.

Fourth Embodiment—4

FIG. 11D includes a plan view (top) and a side view (bottom) illustrating an example (the fifth mode) in which the Curie temperature of each of the second heat generation blocks [B(1) to B(36)], [B(71) to B(106)] is set to be higher than the Curie temperature of each of the first heat generation blocks [B(16) to B(26)] in the heating member 42 illustrated in FIG. 11C.

In the heating member 42 illustrated in FIG. 11A to FIG. 11C (FIG. 11C in this example), the Curie temperature (for example, 230° C. to 270° C.) of each of the second heat generation blocks [B(1) to B(36)], [B(71) to B(106)] is higher than the Curie temperature (for example, 220° C.) of each of the first heat generation blocks B(37) to B(70).

In this way, even when the temperature of each of the second heat generation blocks [B(1) to B(36)], [B(71) to B(106)] is increased to some extent, the increase in the resistance value can be suppressed, and thus the supply of the electric power can be maintained accordingly. Accordingly, it is possible to maintain the temperatures of the first heat generation blocks [B(37) to B(70)] and thus to stably maintain the fixing property in the width direction W.

OTHER EMBODIMENTS

In the example described so far, the fixing belt is applied as the fixing member. However, the fixing roller may be used.

EXAMPLES

Since experiments on the durability of the heating member 42 in the fixing device 4 were conducted, the experiments are described below with a reference example.

In Examples 1 to 3 and the reference example, the fixing device 4 including the following components was used: the fixing belt 41 in which a silicone elastic layer having a thickness of 300 μm was provided on a polyimide base material having a thickness of 50 μm and the surface layer of the PFA tube having a thickness of 30 μm was further provided thereon; and the pressure roller 43 in which the silicone sponge layer having a thickness of 6 mm was provided as the elastic body layer on the outer circumferential surface of the core metal having an outer diameter of 13 mm and the outer circumferential surface of the elastic body layer was further coated with the PFA tube layer having a thickness of 30 μm as the surface layer.

As a paper passing condition, a total of 10000 sheets, which included 1000 sheets in each of the A4 horizontal size/A3 vertical size [S(6)] and the B5 horizontal size/B4 vertical size [S(5)], were made to pass alternately.

Example 1

The heating member 42 illustrated in FIG. 4 was subjected to a paper passing aging test at a process speed of 180 mm/sec. The heating member 42 included the heat generation blocks B(1) to B(22) as a total of the 22 (the clearance f: 0.5 mm, the arrangement pitch PT: 14 mm) heat generation blocks, each of which had a width of 13.5 mm in the width direction W. Each of the heat generation blocks B(1) to B(22) was formed by adding lead titanate ($PbTiO_3$) to barium titanate ($BaTiO_3$) as the base.

Reference Example

Figure 12:
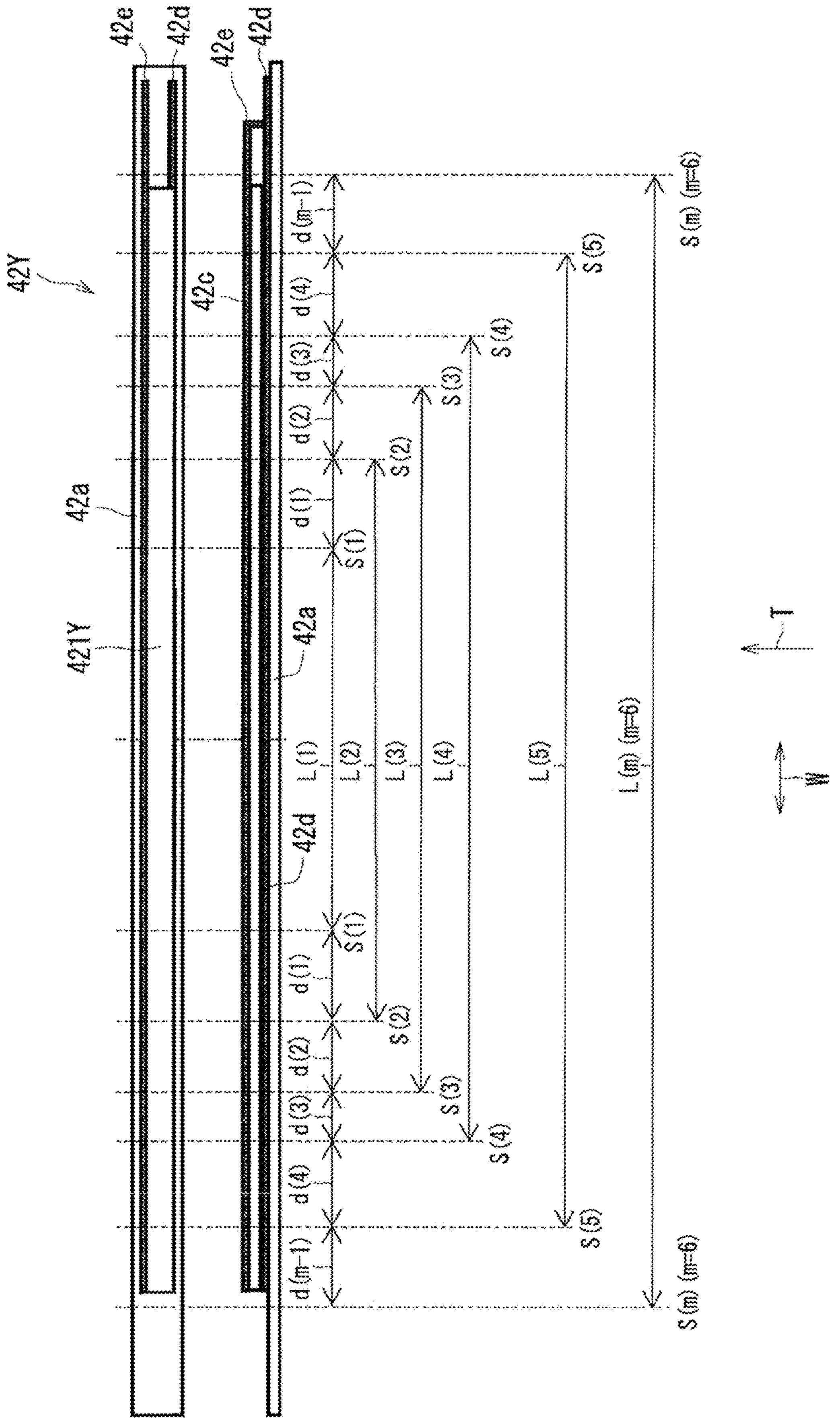
FIG. 12 includes a plan view (top) and a side view (bottom) illustrating a schematic configuration of a single heat generator in a heating member according to a reference example.
Figure 13:
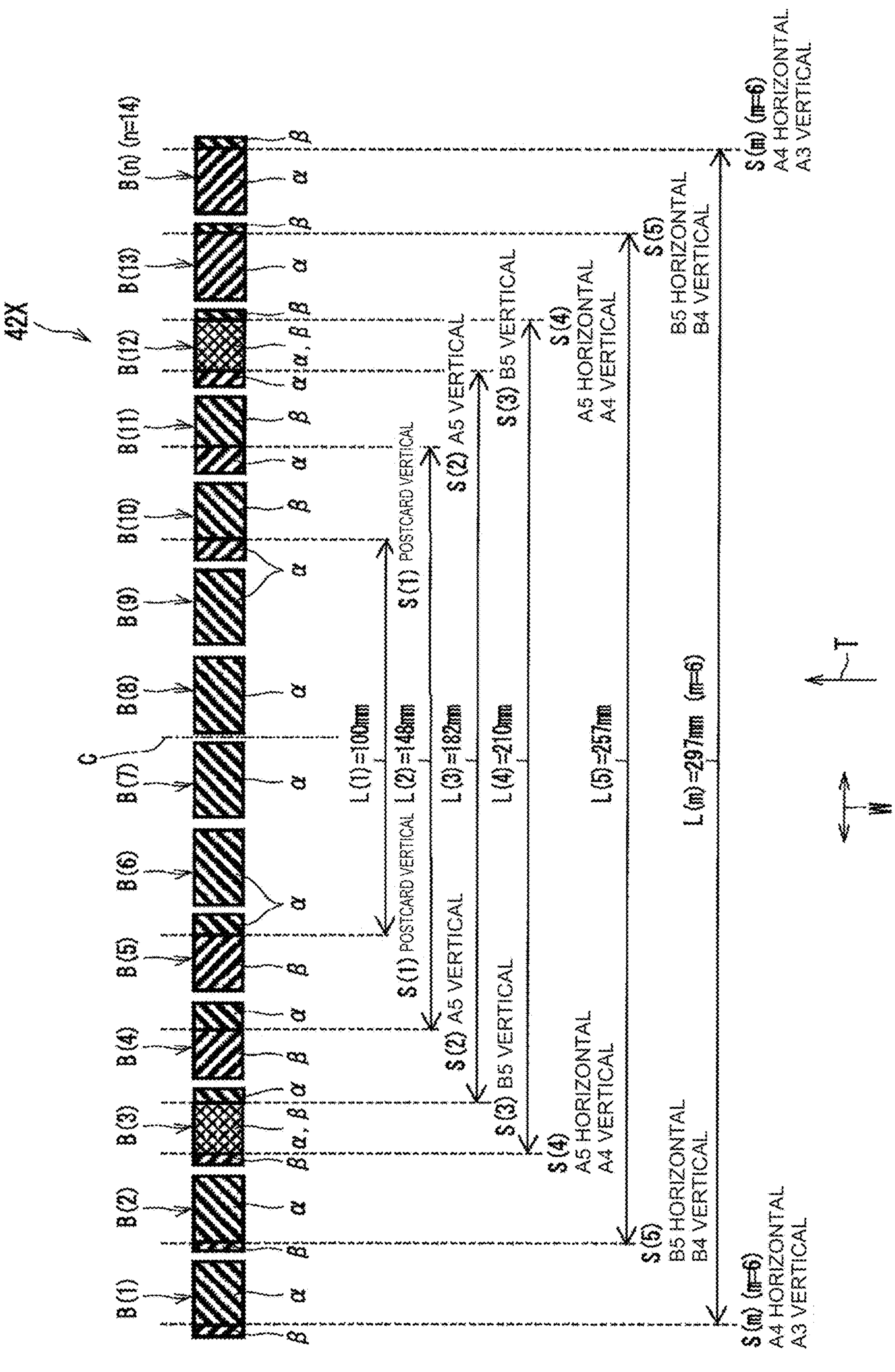
FIG. 13 is a plan view illustrating a schematic configuration of plural heat generation blocks in a heating member of the related art.

FIG. 12 includes a plan view (top) and a side view (bottom) illustrating a schematic configuration of a single heat generator 421Y in a heating member 42Y according to the reference example.

The heating member 42Y includes the single heat generator 421Y that generates heat when being energized.

Evaluation Result in Reference Example

In the reference example, as a result of performing the same test by using the single heat generator 421Y illustrated in FIG. 12, damage to the heating member 42Y, such as peeling of a contact portion between the heat generator 421Y and the insulating substrate 42*a* due to thermal damage, was observed.

Evaluation Result in Example 1

Meanwhile, the damage to each of the members was not observed in the heating member 42 configured as illustrated in FIG. 4 even after passing of the sheet was completed, and favorable images were obtained through aging.

Thus, it was found that the durability of the heating member 42 could be improved when compared to the heating member 42Y in the reference example.

Example 2

The same paper passing test as that in Example 1 was performed on the heating member 42. Although not illustrated, the heating member 42 included the heat generation blocks B(1) to B(24) formed by respectively providing the heat generation blocks B(1), B(24) at the ends in the width direction W of the heat generation blocks B(1) to B(22) illustrated in FIG. 4. As a result, the similar images as those in Example 1 were obtained over aging, and the heating member 42 after aging was in the better condition than the heating member 42 in Example 1.

Just as described, it was found that unevenness of the temperature in the heat generation blocks B(1) to B(24) could be eliminated and the heating member 42 could have the superior durability by causing the ends in the width direction W of each of the recording media P in the standard sizes to match the joints between two respective pair of the heat generation blocks B(2) to B(23) or the ends of the heat generation blocks B(1), B(24) at both ends.

Example 3

Although not illustrated, the heat generation blocks B(1), B(24) were respectively provided at the ends in the width direction W of the heat generation blocks B(1) to B(22) illustrated in FIG. 4. Furthermore, the Currie temperature of each of the first heat generation blocks B(10) to B(15) was adjusted to 220° C., and the Currie temperature of each of the second heat generation blocks B(1) to B(9), B(16) to B(24) was adjusted to 250° C. by increasing a composition ratio of lead titanate ($PbTiO_3$) in each of the second heat generation blocks B(1) to B(9), B(16) to B(24) on the outer sides.

No problem occurred when 100 sheets in the postcard vertical size [S(1)] as the minimum size [S(1)] passed through heating member 42 including the heat generation blocks B(1) to B(24), in which the Curie temperature of each of the second heat generation blocks B(1) to B(9), B(16) to B(24) was increased to 250° C. and was thus higher than 220° C. as the Curie temperature of each of the first heat generation blocks B(10) to B(15). Furthermore, even when 1000 sheets of the recording medium P in the A4 vertical size passed through the heating member 42, due to the effect of increasing the Curie temperature of each of the second heat generation blocks B(1) to B(9), B(16) to B(24), the temperature at the ends in the width direction W of the recording media P could be maintained, and the favorable fixed images could be obtained.

The present disclosure is not limited to the embodiments described so far and may be implemented in various other forms. Therefore, the embodiments are merely examples in all respects, and should not be interpreted in a limited manner. The scope of the present disclosure is defined by the appended claims and is not limited by the description of the specification. Furthermore, all modifications and changes belonging to the equivalent scope of the claims fall within the scope of the present disclosure.

What is claimed is:

1. A heating member for heating a fixing member, the heating member comprising:
- a plurality of heat generation blocks, each of which generating heat when being energized, wherein:
  - the plurality of heat generation blocks is provided side by side along a width direction that is orthogonal to a conveyance direction of a recording medium,
  - a length of at least one of the plurality of heat generation blocks in the width direction is equal to, or shorter than, a minimum difference of a length in the width direction between recording media, including the recording medium, in adjacent standard sizes in an order of length in the width direction among the recording media to be conveyed in a plurality of types of standard sizes,
  - each of the plurality of heat generation blocks has a positive temperature coefficient, and
  - among the plurality of heat generation blocks, a first heat generation block and a second heat generation block, different from the first heat generation block, are provided, such that:
    - the first heat generation block corresponds to an area passed by the recording medium in a minimum size having a shortest length in the width direction of the recording media in the plurality of types of the standard sizes, and
    - a Curie temperature of the second heat generation block is higher than a Curie temperature of the first heat generation block.

2. The heating member according to claim 1, wherein the at least one of the plurality of heat generation blocks having the length equal to, or shorter than, the minimum difference is located between ends of the recording media in the adjacent standard sizes.

3. The heating member according to claim 1, wherein the length, in the width direction, of the at least one of the plurality of heat generation blocks is 14 mm or shorter.

4. The heating member according to claim 1, wherein:
- the plurality of heat generation blocks does not include a non-passing area of the recording medium, and
- end positions in the width direction of the recording media in the plurality of types of the standard sizes match:
  - boundary positions between two respective pairs of the plurality of heat generation blocks, or
  - end positions of two heat generation blocks of the plurality of heat generation blocks that are located at both ends in the width direction.

5. The heating member according to claim 1, wherein the length, in the width direction, of the at least one of the plurality of heat generation blocks is 5 mm or longer.

6. The heating member according to claim 1, wherein one or more of the plurality of heat generation blocks exist on an outer side of a heat generation block that corresponds to an end, in the width direction, of the recording medium in a maximum size having a longest length, in the width direction, of the recording media in the plurality of types of the standard sizes.

7. The heating member according to claim 1, wherein the Curie temperature of the second heat generation block is higher than the Curie temperature of the first heat generation block by 10° C. or more.

8. The heating member according to claim 1, wherein the length, in the width direction, of the at least one of the plurality of heat generation blocks is 9 mm or shorter.

9. The heating member according to claim 1, wherein a length of at least one of the plurality of heat generation blocks that is entirely, or partially, located outside the recording medium in the minimum size having the shortest length, in the width direction, of the recording media in the plurality of types of the standard sizes, is equal to, or shorter than, the minimum difference.

10. A fixing device comprising:
the heating member according to claim 1.

11. An image forming apparatus comprising:
the fixing device according to claim 10.

* * * * *